United States Patent
Aybay

(10) Patent No.: US 9,225,666 B1
(45) Date of Patent: Dec. 29, 2015

(54) DISTRIBUTED MULTI-STAGE SWITCH FABRIC

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 381 days.

(21) Appl. No.: 12/414,825

(22) Filed: Mar. 31, 2009

(51) Int. Cl.
*H04L 12/50* (2006.01)
*H04Q 11/00* (2006.01)
*H04L 12/933* (2013.01)
*H04L 12/931* (2013.01)
*H04Q 3/68* (2006.01)

(52) U.S. Cl.
CPC ............... *H04L 49/15* (2013.01); *H04L 49/10* (2013.01); *H04L 49/45* (2013.01); *H04Q 3/685* (2013.01)

(58) Field of Classification Search
CPC ............ H04L 49/1515; H04L 49/1523; H04L 49/1569; H04L 49/15; H04L 49/10; H04L 49/45; H04L 12/50; H04Q 3/64; H04Q 3/645; H04Q 3/66; H04Q 3/665; H04Q 3/68; H04Q 3/685
USPC ......... 370/388, 235, 419, 355, 367, 370, 372, 370/386, 387
See application file for complete search history.

(56) References Cited

U.S. PATENT DOCUMENTS

| | | | |
|---|---|---|---|
| 4,722,603 A | 2/1988 | Graebner et al. | |
| 5,138,615 A | 8/1992 | Lamport et al. | |
| 5,329,520 A * | 7/1994 | Richardson | 370/225 |
| 5,801,641 A | 9/1998 | Yang et al. | |
| 5,926,473 A | 7/1999 | Gridley | |
| 5,987,028 A | 11/1999 | Yang et al. | |
| 5,991,295 A | 11/1999 | Tout et al. | |
| 6,049,542 A | 4/2000 | Prasad | |
| 6,075,773 A | 6/2000 | Clark et al. | |
| 6,243,388 B1 * | 6/2001 | Mussman et al. | 370/420 |
| 6,539,027 B1 | 3/2003 | Cambron | |
| 6,614,236 B1 | 9/2003 | Karam | |

(Continued)

FOREIGN PATENT DOCUMENTS

EP 1 892 905 2/2008

OTHER PUBLICATIONS

Electronic design, "Optimized Interconnect Eliminates Limits in Orthogonal Architectures" [online] [originally retrieved on Nov. 5, 2008] Retrieved from the Internet: <URL:http://electronicdesign.com/Articles/Print.cfm?AD=1&ArticleID=13277>, (9 pgs).

(Continued)

*Primary Examiner* — Hoang-Chuong Vu
(74) *Attorney, Agent, or Firm* — Cooley LLP

(57) ABSTRACT

A system includes a first switch fabric portion and a second switch fabric portion. The first switch fabric portion is disposed within a first chassis and has a module associated with a first stage of a switch fabric and a module associated with a second stage of the switch fabric. The module of the first switch fabric portion associated with the first stage of the switch fabric is configured to send data to the module of the first switch fabric portion associated with the second stage of the switch fabric. The second switch fabric portion is disposed within a second chassis and has a module associated with the second stage of the switch fabric. The module of the first switch fabric portion associated with the first stage of the switch fabric is configured to send data to the module of the second switch fabric portion associated with the second stage of the switch fabric.

15 Claims, 17 Drawing Sheets

(56) References Cited

U.S. PATENT DOCUMENTS

| | | | |
|---|---|---|---|
| 6,636,511 B1 | 10/2003 | Roy et al. | |
| 6,704,307 B1* | 3/2004 | Graves et al. | 370/372 |
| 6,816,486 B1* | 11/2004 | Rogers | 370/387 |
| 6,868,082 B1 | 3/2005 | Allen, Jr. et al. | |
| 7,038,135 B1 | 5/2006 | Chan et al. | |
| 7,173,931 B2 | 2/2007 | Chao et al. | |
| 7,229,020 B2 | 6/2007 | Goodison et al. | |
| 7,230,947 B1 | 6/2007 | Huber et al. | |
| 7,248,760 B1 | 7/2007 | Corbalis et al. | |
| 7,277,429 B2 | 10/2007 | Norman et al. | |
| 7,280,356 B2 | 10/2007 | Pfahnl et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,496,252 B1 | 2/2009 | Corbalis et al. | |
| 7,505,458 B2 | 3/2009 | Menon et al. | |
| 7,552,262 B1* | 6/2009 | Turner et al. | 710/302 |
| 7,693,142 B2 | 4/2010 | Beshai | |
| 2002/0064170 A1 | 5/2002 | Siu et al. | |
| 2002/0181455 A1* | 12/2002 | Norman et al. | 370/389 |
| 2003/0002541 A1* | 1/2003 | Fowler et al. | 370/535 |
| 2004/0023558 A1 | 2/2004 | Fowler et al. | |
| 2004/0028038 A1* | 2/2004 | Anderson et al. | 370/386 |
| 2005/0058128 A1* | 3/2005 | Carson et al. | 370/388 |
| 2005/0275504 A1* | 12/2005 | Torza | 340/2.22 |
| 2006/0013207 A1* | 1/2006 | McMillen et al. | 370/388 |
| 2006/0126610 A1* | 6/2006 | Ryan et al. | 370/388 |
| 2006/0165085 A1 | 7/2006 | Konda | |
| 2007/0016715 A1 | 1/2007 | Phelps et al. | |
| 2007/0140229 A1* | 6/2007 | Tang | 370/360 |
| 2007/0153462 A1 | 7/2007 | Crippen et al. | |
| 2008/0044181 A1* | 2/2008 | Sindhu | 398/49 |
| 2008/0112133 A1 | 5/2008 | Torudbakken et al. | |
| 2008/0130517 A1 | 6/2008 | Lee et al. | |
| 2008/0151863 A1* | 6/2008 | Lawrence et al. | 370/351 |
| 2008/0159738 A1 | 7/2008 | Lavranchuk | |
| 2008/0186875 A1 | 8/2008 | Kitani | |
| 2008/0192648 A1 | 8/2008 | Galles | |
| 2008/0212472 A1* | 9/2008 | Musacchio et al. | 370/232 |
| 2008/0214059 A1 | 9/2008 | Rothermel et al. | |
| 2008/0318465 A1 | 12/2008 | Johnsen et al. | |
| 2008/0320117 A1 | 12/2008 | Johnsen et al. | |
| 2009/0003327 A1 | 1/2009 | Zang et al. | |
| 2009/0028229 A1 | 1/2009 | Cagno et al. | |
| 2009/0175281 A1* | 7/2009 | Higuchi et al. | 370/401 |
| 2010/0002588 A1* | 1/2010 | Cantwell et al. | 370/241 |
| 2010/0165843 A1* | 7/2010 | Thomas | 370/235 |
| 2010/0165983 A1 | 7/2010 | Aybay et al. | |
| 2010/0165984 A1* | 7/2010 | Aybay et al. | 370/388 |
| 2011/0302346 A1* | 12/2011 | Vahdat et al. | 710/301 |
| 2012/0320742 A1* | 12/2012 | Thomas | 370/229 |

OTHER PUBLICATIONS

Jonathan S. Turner et al. "Multirate Clos Networks" IEEE Communications Magazine, Oct. 2003, pp. 1-11.

H. Jonathan Chao et al. "Matching Algorithms for Three-Stage Bufferless Clos Network Switches" IEEE Communications Magazine, Oct. 2003, pp. 46-54.

Search Report for European Application No. 09170037.7, mailed Dec. 10, 2009, 7 pages.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Gunes Aybay et al., "Front-to-Back Cooling System for Modular Systems with Orthogonal Midplane Configuration" U.S. Appl. No. 12/167,604, filed Jul. 3, 2008, (25 pgs).

Office Action mailed May 25, 2010 for U.S. Appl. No. 12/345,500 (13 pages).

Office Action mailed Jun. 10, 2010 for U.S. Appl. No. 12/345,502 (24 pages).

U.S. Appl. No. 12/564,080, filed Sep. 22, 2009 entitled "Systems and Methods for Identifying Cable Connections in a Computing System" (51 pgs).

U.S. Appl. No. 12/613,313, filed Nov. 5, 2009 entitled "Methods and Apparatus for Upgrading a Switch Fabric" (63 pgs).

U.S. Appl. No. 12/752,704, filed Apr. 1, 2010 entitled "Apparatus and Methods Related to the Packaging and Cabling Infrastructure of a Distributed Switch Fabric" (39 pgs).

Final Office Action mailed Nov. 19, 2010 for U.S. Appl. No. 12/345,502 (26 pages).

* cited by examiner

DISTRIBUTED MULTI-STAGE SWITCH FABRIC

RELATED APPLICATION

This application is related to co-pending U.S. patent application Ser. No. 12/345,500, entitled "System Architecture for a Scalable and Distributed Multi-Stage Switch Fabric," filed on Dec. 29, 2008, and co-pending U.S. patent application Ser. No. 12/345,502, entitled "Methods and Apparatus related to a Modular Switch Architecture," filed on Dec. 29, 2008, each of which is incorporated herein by reference in its entirety.

BACKGROUND

Embodiments described herein relate generally to switch fabrics and more particularly, to the system architecture of distributed switch fabrics such as Clos networks.

Clos networks are multi-stage switch networks that provide non-blocking connections between multiple input ports and multiple output ports. A non-blocking network is a network in which a data path through the network can always be established between an idle input port and an idle output port.

A three-stage Clos network, for example, has a middle stage connected between an input stage and an output stage. Each stage includes multiple modules. Each input stage module has multiple input ports and is operatively coupled to each middle stage module. Similarly, each output stage module has multiple output ports and is connected to each middle stage module.

A distributed switch fabric having input stage modules with a large number of input and/or output ports and/or a switch fabric having a large number of modules within each stage has many connections between each stage. Thus, a large number of cables are often required to connect the stages. Further, if the switch fabric is expanded, a large number of cables must be used to connect the new stages and/or the new input and/or output ports to the existing stages. Additionally, when expanding the switch fabric to include additional inputs and/or output ports, the switch fabric typically has its operation temporally suspended.

Thus, a need exists for a distributed switch fabric having fewer cable connections. Further, a need exists for a distributed switch fabric that can expand to include additional inputs/outputs and/or additional modules within each stage without significantly increasing the cabling and/or without having to suspend operation during expansion.

SUMMARY

A system includes a first switch fabric portion and a second switch fabric portion. The first switch fabric portion is disposed within a first chassis and has a module associated with a first stage of a switch fabric and a module associated with a second stage of the switch fabric. The module of the first switch fabric portion associated with the first stage of the switch fabric is configured to send data to the module of the first switch fabric portion associated with the second stage of the switch fabric. The second switch fabric portion is disposed within a second chassis and has a module associated with the second stage of the switch fabric. The module of the first switch fabric portion associated with the first stage of the switch fabric is configured to send data to the module of the second switch fabric portion associated with the second stage of the switch fabric.

DETAILED DESCRIPTION

Figure 1:
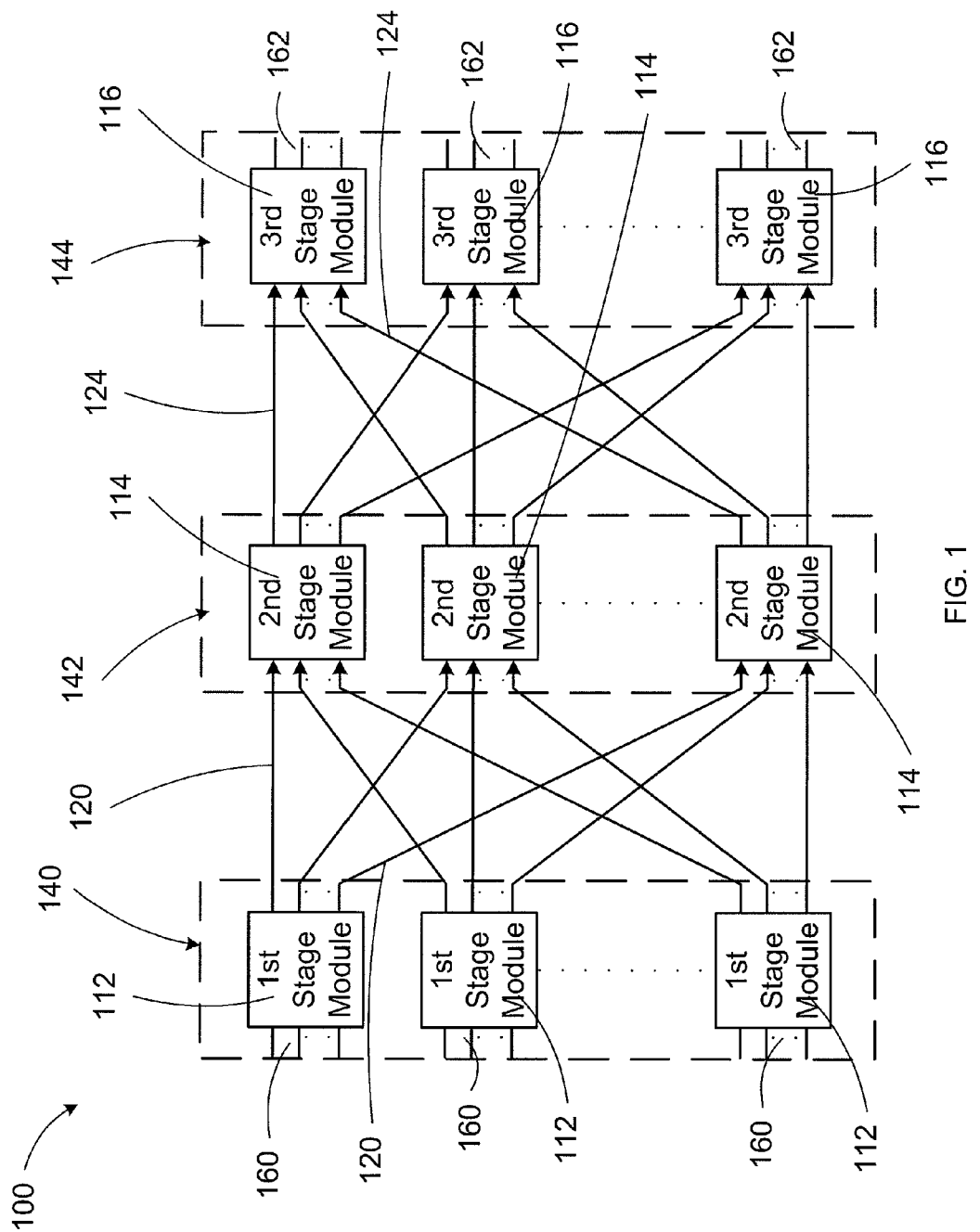
FIG. 1 is a schematic illustration of a switch fabric, according to an embodiment.

In some embodiments, a system includes a first switch fabric portion and a second switch fabric portion. The first switch fabric portion is disposed within a first chassis and has a module associated with a first stage of a switch fabric and a module associated with a second stage of the switch fabric. The module of the first switch fabric portion associated with the first stage of the switch fabric is configured to send data to the module of the first switch fabric portion associated with the second stage of the switch fabric. The second switch fabric portion is disposed within a second chassis and has a module associated with the second stage of the switch fabric. The module of the first switch fabric portion associated with the first stage of the switch fabric is configured to send data to the module of the second switch fabric portion associated with the second stage of the switch fabric. Thus, the module of the first switch fabric portion associated with the first stage of the switch fabric can send data to both the module of the first switch fabric portion associated with the second stage of the switch fabric and the module of the second switch fabric portion associated with the second stage of the switch fabric.

In some embodiments, the first switch fabric portion and the second switch fabric portion both include a module associated with every stage within the switch fabric. For example, if the switch fabric is a three-stage switch fabric, both the first switch fabric portion and the second switch fabric portion include modules associated with three stages of the switch fabric. In such embodiments, each switch fabric portion can operate as a stand-alone switch fabric or can be coupled together by cables to expand the capacity of the switch fabric system. Having a module associated with each stage of the switch fabric in each chassis within the system reduces the number of cables used to connect the separate chassis to the other chassis. Additionally, because each switch fabric portion can operate as a stand-alone switch fabric, the system can be expanded to include other switch fabric portions without any operational downtime of the system.

As used herein, a switch fabric is a network that includes multiple stages of switches that operatively connect one or more input devices with one or more output devices. A switch fabric is configured to receive an input signal from an input device, forward the signal through the multiple stages of switches, and output the signal to an output device. Each switch of the multiple stages of switches routes the signal such that the signal arrives at its destination. Such a switch fabric can be referred to, for example, as a Clos network.

As used herein, a module that is within a switch fabric can be any assembly and/or set of operatively coupled electrical components that defines one or more switches within a stage of a switch fabric. An input/output module, for example, can be any assembly and/or set of operatively coupled electrical components configured to send data to and/or receive data from a switch fabric. In some embodiments, for example, an input/output module can be an access switch configured receive data from a server, prepare data to enter into the switch fabric, and send the data to the switch fabric. In some embodiments, a module can include, for example, a memory, a processor, electrical traces, optical connectors, and/or the like.

As used herein, "associated with" means included in, physically located with, a part of, operates or functions as a part of, and/or any other meaning of "associated with" known in the art. For example, a module associated with a first stage of a switch fabric can be said to be included in, physically located with or a part of the first stage of the switch fabric. A module associated with a first stage of a switch fabric can also be said to operate or function as a part of the first stage of the switch fabric.

As used in this specification, the singular forms "a," "an" and "the" include plural referents unless the context clearly dictates otherwise. Thus, for example, the term "a network device" is intended to mean a single network device or a combination of network devices; and "network management module" is intended to mean one or more network management module, or a combination thereof.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIGS. 1 through 15 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 112 of the first stage 140 is a cell switch. The cell switches are configured to redirect data as it flows through the switch fabric 100. In some embodiments, for example, each cell switch includes multiple input ports operatively coupled to write interfaces on a memory buffer. Similarly, a set of output ports are operatively coupled to read interfaces on the memory buffer (not shown). In some embodiments, the memory buffer can be a shared memory buffer implemented using on-chip static random access memory (SRAM) to provide sufficient bandwidth for all input ports to write one incoming cell (e.g., a portion of a data packet) per time period (e.g., one or more clock cycles) and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data (e.g., a signal, a cell of a packet, etc.) as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module 112 of the first stage 140 by a data path 120. Each data path 120 between a given module 112 of the first stage 140 and a given module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to facilitate data transfer from the modules 112 of the first stage 140 to the modules 114 of the second stage 142. In some embodiments, for example, the data paths 120 are optical connectors between the modules. In other embodiments, the data paths are within a midplane. Such a midplane can be similar to that described in further detail herein. Such a midplane can be used to connect each module of the second stage with each module of the first stage. In still other embodiments, two or more modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is typically equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is typically equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to facilitate data transfer from the modules 114 of the second stage 142 to the modules 116 of the third stage 144. In some embodiments, for example, the data paths 124 are optical connectors between the modules. In other embodiments, the data paths are within a midplane. Such a midplane can be similar to that described in further detail herein. Such a midplane can be used to connect each module of the second stage with each module of the third stage. In still other embodiments, two or more modules are contained within a single chip package and the data paths are electrical traces.

Figure 2:
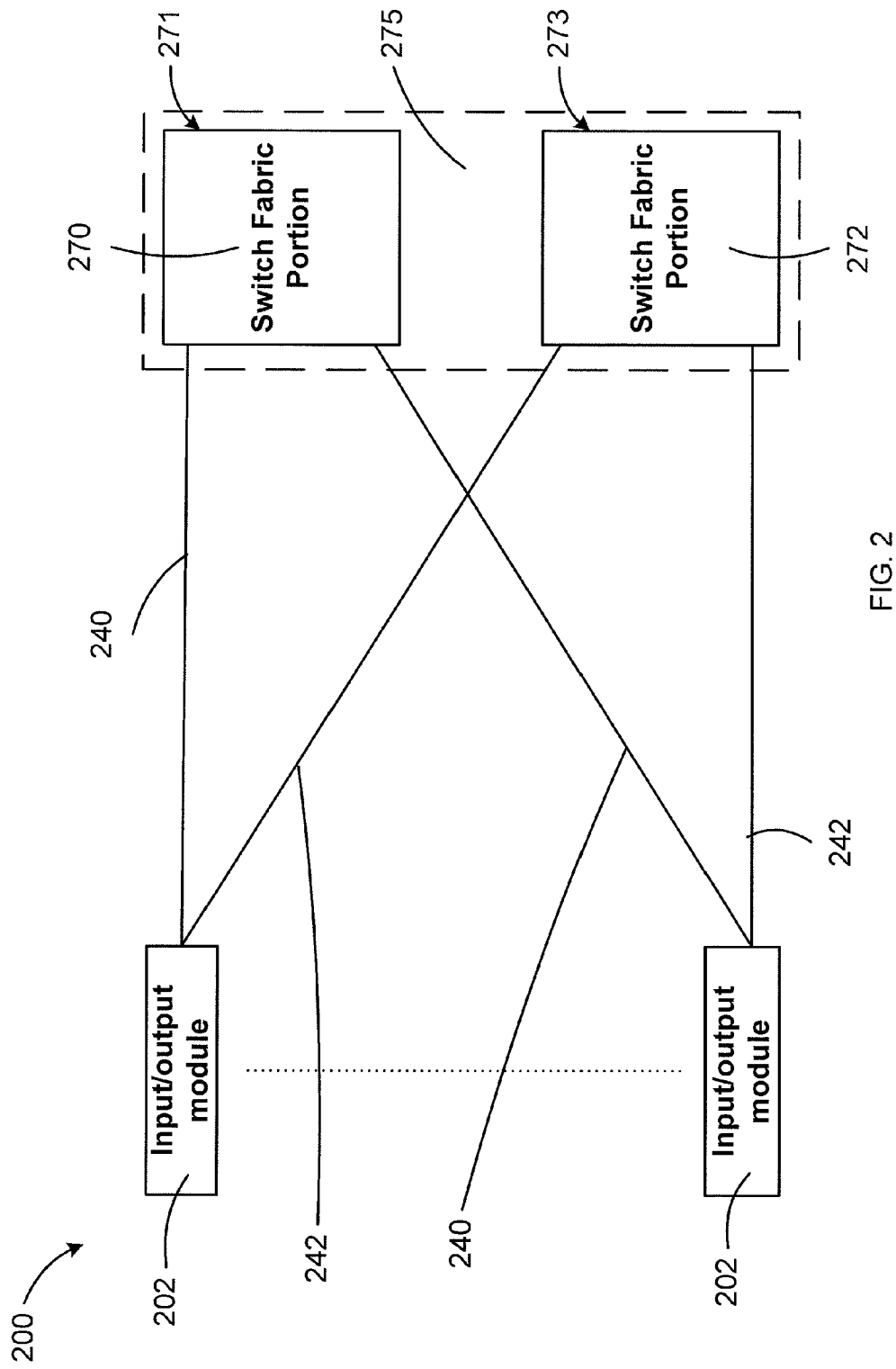
FIG. 2 is a schematic illustration of a switch fabric system, according to another embodiment.

FIG. 2 is a schematic illustration of a switch fabric system 200, according to an embodiment. Switch fabric system 200 includes multiple input/output modules 202, a first set of cables 240, a second set of cables 242, and a switch fabric 275. The switch fabric 275 includes a first switch fabric portion 271 disposed within a chassis 270 or housing, and a second switch fabric portion 273 disposed within a chassis 272 or housing.

The input/output modules 202 are configured to send data to and/or receive data from the first switch fabric portion 271 and/or the second switch fabric portion 273. Additionally, each input/output module 202 includes a parsing function, a classifying function, a forwarding function, and a queuing-and-scheduling function. Thus, packet parsing, packet classifying, packet forwarding, and packet queuing-and-scheduling all occur prior to a data packet entering the first switch fabric portion 271 and/or the second switch fabric portion 273. Accordingly, these functions do not need to be performed at each stage of the switch fabric 275, and each module of the switch fabric portions 271, 273 (described in further detail herein) do not need to include capabilities to perform these functions. This reduces the cost, power consumption, cooling requirements and the physical area required for each module of the switch fabric portions 271, 273. This also reduces the latency associated with the switch fabric 275. In some embodiments, for example, the end-to-end latency (i.e., time it takes to send data through the switch fabric 275 from an input/output module 202 to another input/output module 202) can be lower than the end-to-end latency of a switch fabric system using an Ethernet protocol. In some embodiments, the throughput of the switch fabric portions 271, 273 is constrained only by the connection density of the switch fabric system 200 and not by power and thermal limitations. The parsing function, classifying function, forwarding function, and queuing-and-scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each input/output module 202 is configured to connect to a first end of a cable of the first set of cables 240 and a first end of a cable of the second set of cables 242. Each cable 240 operatively connects an input/output module 202 and the first switch fabric portion 271. Similarly, each cable 242 operatively connects an input/output module 202 and the second switch fabric portion 273. Using the first set of cables 240 and the second set of cables 242, each input/output module 202 can send data to and/or receive data from the first switch fabric portion 271 and/or the second switch fabric portion 273, respectively.

The first set of cables 240 and the second set of cables 242 can be constructed of any material suitable to transfer data between the input/output modules 202 and the switch fabric portions 271, 273. In some embodiments, for example, each cable 240, 242 is constructed of multiple optical fibers. In such an embodiment, each cable 240, 242 can have twelve transmit and twelve receive fibers. The twelve transmit fibers of each cable 240, 242 can include eight fibers for transmitting data, one fiber for transmitting a control signal, and three fibers for expanding the data capacity and/or for redundancy. Similarly, the twelve receive fibers of each cable 240, 242 have eight fibers for receiving data, one fiber for receiving a control signal, and three fibers for expanding the data capacity and/or for redundancy. In other embodiments, any number of fibers can be contained within each cable. The transmit and receive designations of the fibers are from the perspective of the input/output modules 202. The designations are opposite if viewed from the perspective of the switch fabric portions 271, 273.

A first switch fabric portion 271 is used in conjunction with a second switch fabric portion 273 for redundancy and/or greater capacity. In other embodiments, only one switch fabric portion is used. In still other embodiments, more than two switch fabric portions are used for increased redundancy and/or greater capacity. For example, four switch fabric portions can be operatively coupled to each input/output module by, for example, four cables. The second switch fabric portion 273 is structurally and functionally similar to the first switch fabric 271 portion. Accordingly, only the first switch fabric portion 271 is described in detail herein.

Figure 3:
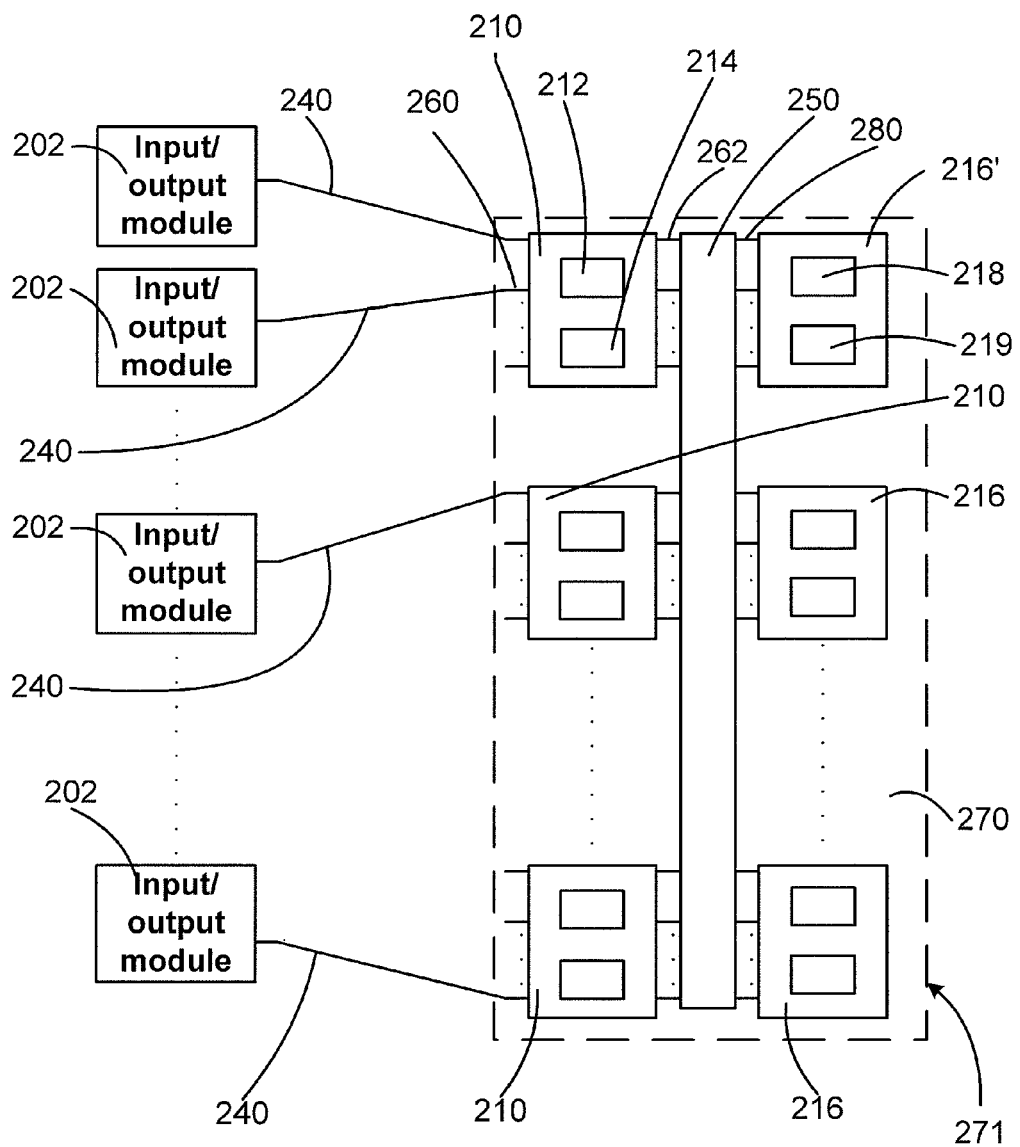
FIG. 3 is a schematic illustration of a portion of the switch fabric system of FIG. 2.

FIG. 3 shows a portion of the switch fabric system 200 of FIG. 2 including the first switch fabric portion 271 in greater detail. The first switch fabric portion 271 includes interface cards 210, which are associated with a first stage and a third stage of the first switch fabric portion 271; interface cards 216, which are associated with a second stage of the first switch fabric portion 271; and a midplane 250. In some embodiments, the first switch fabric portion 271 includes eight interface cards 210, which are associated with the first stage and the third stage of the first switch fabric, and eight interface cards 216, which are associated with the second stage of the first switch fabric. In other embodiments, a different number of interface cards associated with the first stage and the third stage of the first switch fabric and/or a different number of interface cards associated with the second stage of the first switch fabric can be used.

As shown in FIG. 3, each input/output module 202 is operatively coupled to an interface card 210 via one of the cables of the first set of cables 240. In some embodiments, for example, each of eight interface cards 210 is operatively coupled to sixteen input/output modules 202, as described in further detail herein. Thus, the first switch fabric portion 271 can be coupled to 128 input/output modules (16×8=128). Each of the 128 input/output modules 202 can send data to and receive data from the first switch fabric portion 271.

Each interface card 210 is connected to each interface card 216 via the midplane 250. Thus, each interface card 210 can send data to and receive data from each interface card 216, as described in further detail herein. Using a midplane 250 to connect the interface cards 210 to the interface cards 216, decreases the number of cables that would otherwise be used to connect the stages of the first switch fabric portion 271.

Figure 4:
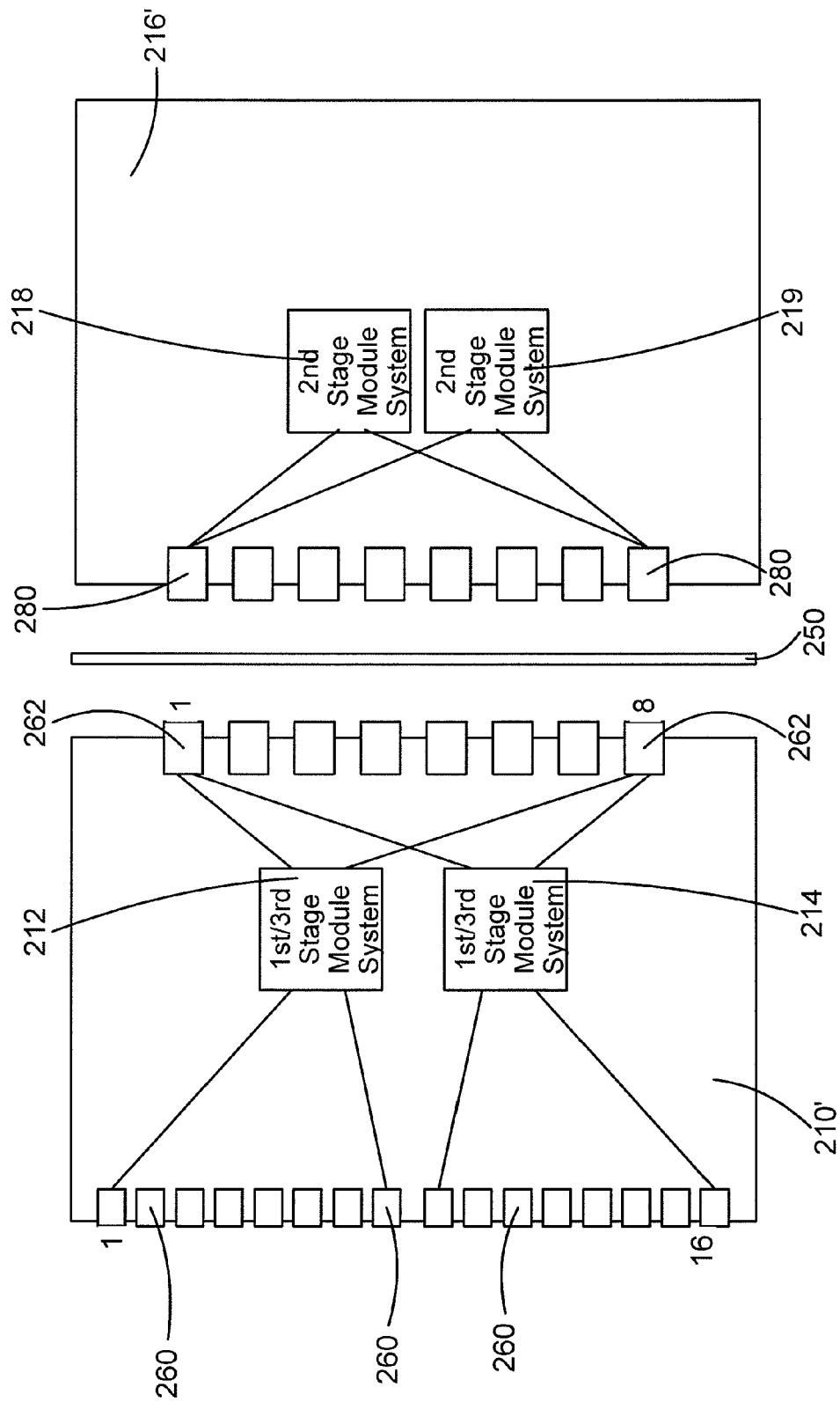
FIG. 4 is a schematic illustration of a portion of the switch fabric system of FIG. 2.

FIG. 4 shows a first interface card 210', the midplane 250, and a first interface card 216', in greater detail. Interface card 210' is associated with the first stage and the third stage of the first switch fabric portion 271, and interface card 216' is associated with the second stage of the first switch fabric portion 271. Each interface card 210 is structurally and functionally similar to the first interface card 210'. Likewise, each interface card 216 is structurally and functionally similar to the first interface card 216'.

The first interface card 210' includes multiple cable connector ports 260, multiple 1st/3rd stage module systems 212, 214, and multiple midplane connector ports 262. In other embodiments, the first interface card includes a single 1st/3rd stage module system.

FIG. 4 shows the first interface card 210' having sixteen cable connector ports 260 and eight midplane connector ports 262. Each cable connector port 260 of the first interface card 210' is configured to receive a second end of a cable from the first set of cables 240. Thus, as stated above, sixteen cable connector ports 260 on each of the eight interface cards 210 are used to receive up to 128 cables (16×8=128). While shown in FIG. 4 as having sixteen cable connector ports 260, in other embodiments, any number of cable connector ports can be used, such that each cable from the first set of cables can be received by a cable connector port in the first switch fabric portion. For example, if sixteen interface cards are used, each interface card can include eight cable connector ports.

The 1st/3rd stage module systems 212, 214 of the first interface card 210' each includes a module associated with the first stage of the first switch fabric portion 271 and a module associated with the third stage of the first switch fabric portion 271. In some embodiments, eight cable connector ports of the sixteen cable connector ports 260 are operatively coupled to the 1st/3rd stage module system 212 and the remaining eight cable connector ports of the sixteen cable connector ports 260 are operatively coupled to the 1st/3rd stage module system 214. Both of the 1st/3rd stage module systems 212, 214 are operatively coupled to each of the eight midplane connector ports 262 of interface card 210'.

The 1st/3rd stage module systems 212, 214 of first interface card 210' are application-specific integrated circuits (ASICs) or chip packages having multiple ASICs. The 1st/3rd stage module systems 212, 214 are instances of the same ASIC or chip package. Said another way, the ASIC or chip package of each 1st/3rd stage module system 212, 214 is substantially similar (i.e., the same kind or type) to the ASIC or chip package of other 1st/3rd stage module systems 212, 214. Thus, manufacturing costs can be decreased because multiple instances of a single ASIC or chip package can be produced. Further, a module associated with the first stage of the first switch fabric portion 271 and a module associated with the third stage of the first switch fabric portion 271 are included on each ASIC and/or each chip package.

In some embodiments, each midplane connector port of the eight midplane connector ports 262 has twice the data capacity of each cable connector port of the sixteen cable connector ports 260. Thus, instead of having eight data transmit and eight data receive connections, the eight midplane connector ports 262 each has sixteen data transmit and sixteen data receive connections. Thus, the bandwidth of the eight midplane connector ports 262 can be substantially equivalent to the bandwidth of the sixteen cable connector ports 260. In other embodiments, each midplane connector port has thirty-two data transmit and thirty-two data receive connections. In such an embodiment, each cable connector port has sixteen data transmit and sixteen data receive connections. In other embodiments, any number of ports and connections are possible.

The eight midplane connector ports 262 of the first interface card 210' are connected to the midplane 250. The midplane 250 is configured to connect each interface card 210, which is associated with the first stage and the third stage of the first switch fabric portion 271, to each interface card 216, which is associated with the second stage of the first switch fabric portion 271. Thus, the midplane 250 ensures that each midplane connector port 262 of each interface card 210 is connected to a midplane connector port 280 of a different interface card 216. Said another way, no two midplane connector ports of the same interface card 210 are operatively coupled to the same interface card 216. Thus, the midplane 250 allows each interface card 210 to send data to and receive data from any of the eight interface cards 216. In other embodiments, other arrangements are possible. For example, an interface card can have at least two midplane connector ports operatively coupled to another interface card.

While FIG. 4 shows a schematic view of the first interface card 210', the midplane 250, and the first interface card 216', in some embodiments, the interface cards 210, the midplane 250, and the interface cards 216 are physically positioned similar to the horizontally-positioned interface cards 320, the midplane 340, and vertically-positioned interface cards 330, respectively, shown in FIGS. 5-7 and described in further detail below. Thus, the modules associated with the first stage and the modules associated with the third stage (both on the interface cards 210) are coupled on one side of the midplane 250, and the modules associated with the second stage (on the interface cards 216) are coupled on the opposite side of the midplane 250. This topology allows each module associated with the first stage to be operatively coupled to each module associated with the second stage, and each module associated with the second stage to be operatively coupled to each module associated with the third stage.

The first interface card 216' includes multiple midplane connector ports 280 and multiple 2nd stage module systems 218, 219. In other embodiments, the first interface card includes a single 2nd stage module system. The multiple midplane connector ports 280 are configured to send data to and receive data from any of the interface cards 210, via the midplane 250. In some embodiments, the first interface card 216' includes eight midplane connector ports 280.

The 2nd stage module systems 218, 219 of the first interface card 216' each include at least one module associated with the second stage and are operatively coupled to each midplane connector port 280 of the first interface card 216'. Thus, through the midplane 250, each of the 1st/3rd stage module systems 212, 214 of the first switch fabric portion 271 is operatively coupled to each of the 2nd stage module systems 218, 219 of the first switch fabric portion 271. Said another way, each module system 212, 214 associated with the first stage and the third stage of the first switch fabric portion 271 can send data to and receive data from any of the module systems 218, 219 associated with the second stage of the first switch fabric portion 271, and vice versa. Specifically, a module associated with the first stage within a module system 212 or 214 can send data to a module associated with the second stage within a module system 218 or 219. Similarly, the module associated with the second stage within the module system 218 or 219 can send data to a module associated with the third stage within a module system 212 or 214. In other embodiments, the module associated with the third stage can send data and/or control signals to the module associated with the second stage, and the module associated with the second stage can send data and/or control signals to the module associated with the first stage.

In embodiments where each module associated with the first stage of the first switch fabric portion 271 has eight inputs (i.e., two modules per each interface card 210), the second stage of the first switch fabric portion 271 can have at least eight modules for the first switch fabric portion 271 to remain rearrangeably non-blocking. Thus, the second stage of the first switch fabric portion 271 has at least eight modules and is rearrangeably non-blocking. In some embodiments, twice the number of modules associated with the second stage are used to facilitate expansion of the switch fabric system 200 from a three-stage switch fabric to a five-stage switch fabric, as shown and described in U.S. patent application Ser. No. 12/345,500 filed on Dec. 29, 2008 and entitled "System Architecture for a Scalable and Distributed Multi-Stage Fabric" which is incorporated herein by reference in its entirety. In such a five-stage switch fabric, the second stage supports twice the switching throughput as the second stage within the three-stage switch fabric of the switch fabric system 200. For example, in some embodiments, sixteen modules associated with the second stage can be used to facilitate future expansion of the switch fabric system 200 from a three-stage switch fabric to a five-stage switch fabric. In other embodiments, the switch fabric can be expanded to have more than five stages.

The 2nd stage module systems 218, 219 of first interface card 216' are application-specific integrated circuits (ASICs) or chip packages having multiple ASICs. The 2nd stage module systems 218, 219 are instances of the same ASIC or chip package. Said another way, the ASIC or chip package of the 2nd stage module system 218 is substantially similar to (i.e., the same kind of type) the ASIC or chip package of the 2nd stage module system 219. Additionally, in some embodiments, the 2nd stage module systems 218, 219, are instances of the ASIC or chip package also used for the 1st/3rd stage module systems 212, 214 of the first interface card 210'. Thus, manufacturing costs can be decreased because multiple instances of a single ASIC or chip package can be used for each of the module systems in the first switch fabric portion 271.

In use, data is transferred from a first input/output module 202 to a second input/output module 202 via the first switch fabric portion 271. The first input/output module 202 sends data into the first switch fabric portion 271 via a cable of the first set of cables 240. The data passes through a cable connector port 260 of one of the interface cards 210' and into a module associated with the first stage within a module system 212 or 214.

The module associated with the first stage within the module system 212 or 214 forwards the data to a module associated with the second stage within a module system 218 or 219, by sending the data through one of the midplane connector ports 262 of the interface card 210', through the midplane 250, and to one of the interface cards 216'. The data enters the interface card 216' through a midplane connector port 280 of the interface card 216'. The data is then sent to the module associated with the second stage within a module system 218 or 219.

The module associated with the second stage determines how the second input/output module 202 is connected and redirects the data back to the interface card 210', via the midplane 250. Because each module system 218 or 219 is operatively coupled to each module system 212 and 214 on interface card 210', the module associated with the second stage within the module system 218 or 219 can determine which module associated with the third stage within the module system 212 or 214 is operatively coupled to the second input/output module and send the data accordingly.

The data is sent to the module associated with the third stage within a module system 212, 214 on the interface card 210'. The module associated with the third stage then sends the data to the second input/output module of the input/output modules 202 via a cable of the first set of cables 240 through a cable connector port 260.

In other embodiments, instead of the module associated with the first stage sending the data to a single module associated with the second stage, the data is separated into separate portions (e.g., cells) and the module associated with the first stage forwards a portion of the data to each module associated with the second stage to which the module associated with the first stage is operatively coupled (e.g., in this embodiment, every module associated with the second stage receives a portion of the data). Each module associated with the second stage then determines how the second input/output module is connected and redirects the portions of the data back to a single module associated with the third stage. The received portions of the data are then reconstructed and the data is sent to the second input/output module.

Figure 6:
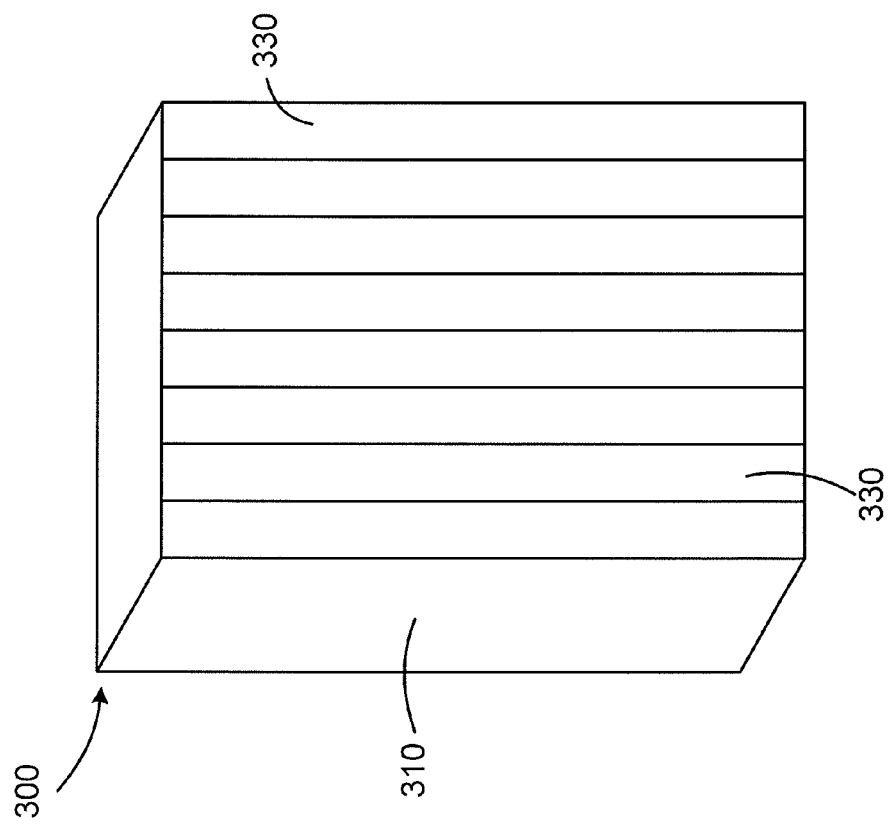
FIGS. 5 and 6 show front and back perspective views respectively, of a chassis used to house at least a portion of a switch fabric system, according to another embodiment.
Figure 5:
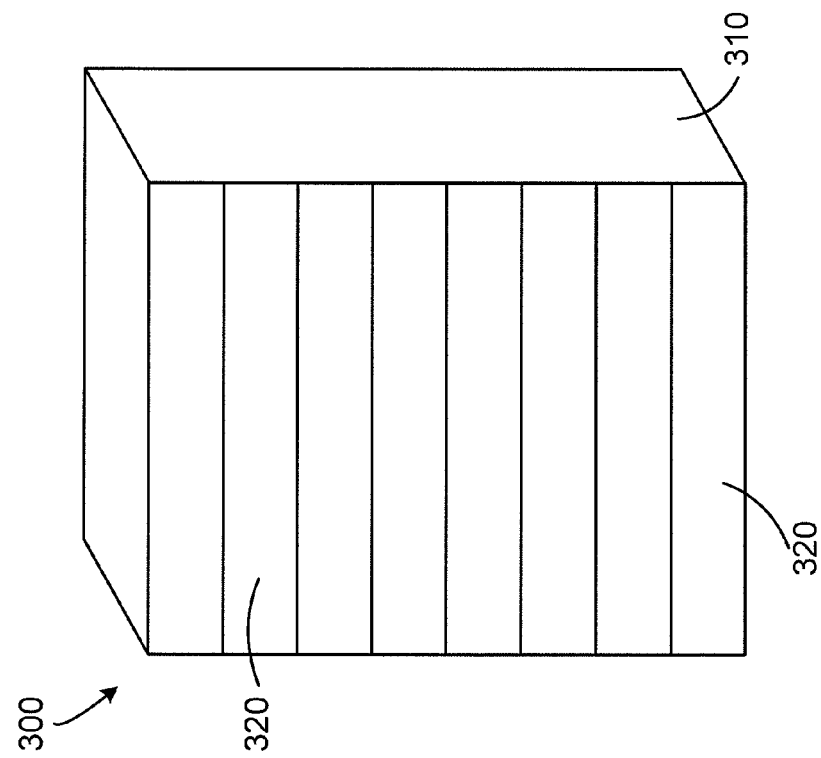
Figure 7:
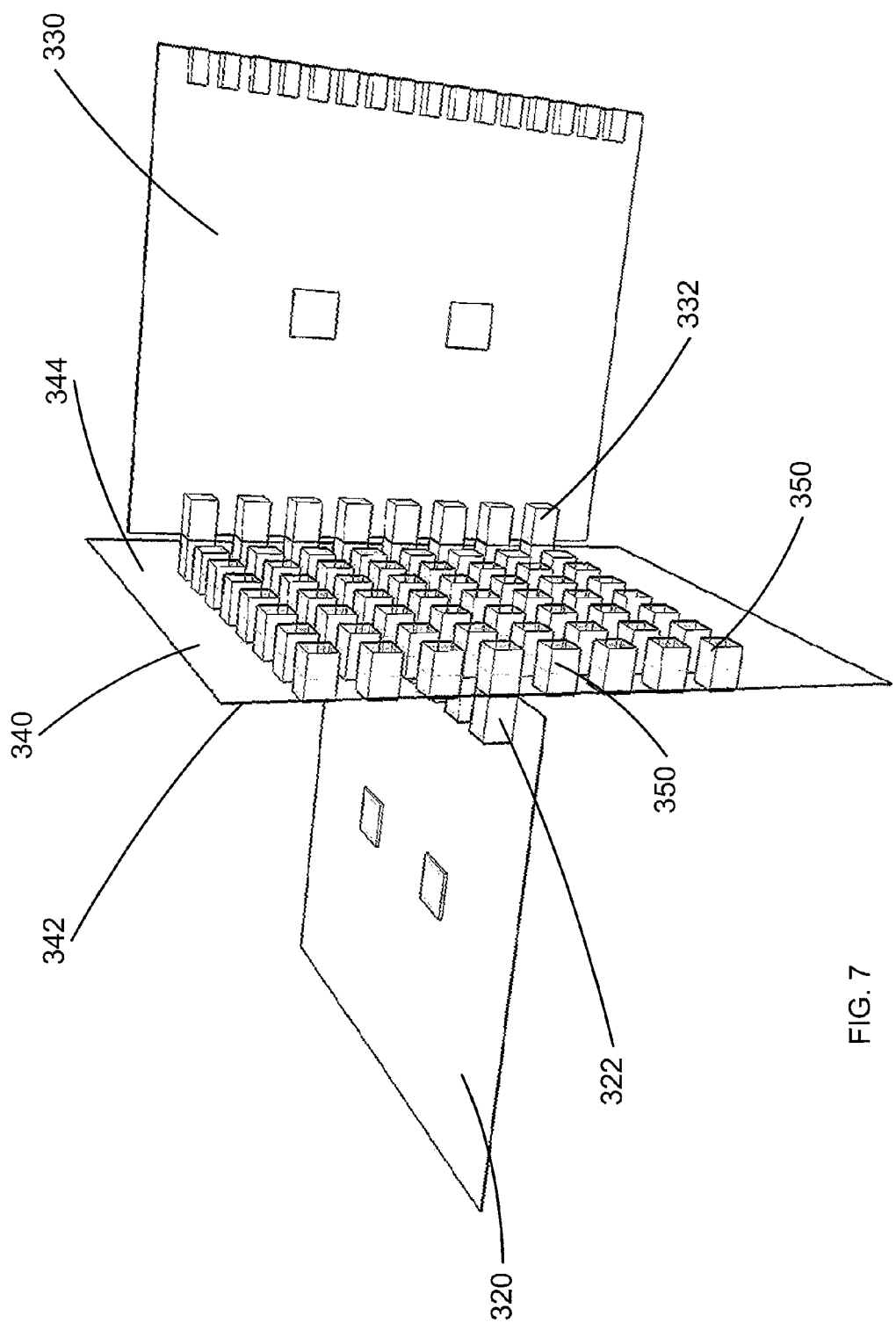
FIG. 7 shows a portion of the chassis of FIG. 5.

FIGS. 5-7 show a chassis 300 (i.e., a housing) used to house at least a portion of a switch fabric (such as first switch fabric portion 271 described above), according to an embodiment. The chassis 300 includes a casing 310, a midplane 340, horizontally-positioned interface cards 320 and vertically-positioned interface cards 330. FIG. 5 shows a front view of the casing 310 in which eight horizontally-positioned interface cards 320 can be seen disposed within the casing 310. FIG. 6 shows a rear view of the casing 310 in which eight vertically-positioned interface cards 330 can be seen disposed within the casing 310.

Each horizontally-positioned interface card 320 is operatively coupled to each vertically-positioned interface card 330 by the midplane 340 (see FIG. 7). The midplane 340 includes a front surface 342, a rear surface 344 and an array of receptacles 350 that connect the front surface 342 with the rear surface 344, as described below. As shown in FIG. 7, the horizontally-positioned interface cards 320 include multiple midplane connector ports 322 that connect to the receptacles 350 on the front surface 342 of the midplane 340. Similarly, the vertically-positioned interface cards 330 include multiple midplane connector ports 332 that connect to the receptacles 350 on the rear surface 344 of the midplane 340. In this manner, a plane defined by each horizontally-positioned interface card 320 intersects a plane defined by each vertically-positioned interface card 330.

The receptacles 350 of the midplane 340 operatively couple each horizontally-positioned interface card 320 to each vertically-positioned interface card 330. The receptacles 350 facilitate the transfer of signals between a horizontally-positioned interface card 320 and a vertically-positioned interface card 330. In some embodiments, for example, the receptacles 350 can be multiple-pin connectors configured to receive multiple pin-connectors disposed on the midplane connector ports 322, 332 of the interface cards 320, 330, hollow tubes that allow a horizontally-positioned interface card 320 to directly connect with a vertically-positioned interface card 330, and/or any other device configured to operatively couple two interface cards. Using such a midplane 340, each horizontally-positioned interface card 320 is operatively coupled to each vertically-positioned interface card 330 without routing connections (e.g., electrical traces) on the midplane.

FIG. 7 shows a midplane including a total of 64 receptacles 350 positioned in an 8×8 array. In such an embodiment, eight horizontally-positioned interface cards 320 can be operatively coupled to eight vertically-positioned interface cards 330. In other embodiments, any number of receptacles can be included on the midplane and/or any number of horizontally-positioned interface cards can be operatively coupled to any number of vertically-positioned interface cards through the midplane.

When the first switch fabric portion 271 is housed in chassis 300, for example, each interface card 210 associated with the first stage and the third stage of the first switch fabric portion 271 is positioned horizontally and each interface card 216 associated with the second stage of the first switch fabric portion 271 is positioned vertically. Thus, each interface card 210 associated with the first stage and the third stage of the first switch fabric portion 271 is easily connected to each interface card 216 associated with the second stage of the first switch fabric portion 271, through the midplane 340. In other embodiments, each interface card associated with the first stage and the third stage of the first switch fabric portion is positioned vertically and each interface card associated with the second stage of the first switch fabric portion is positioned horizontally. In still other embodiments, each interface card associated with the first stage and the third stage of the first switch fabric portion can be positioned at any angle with respect to the chassis and each interface card associated with the second stage of the first switch fabric portion can be positioned at an angle substantially orthogonal to the angle of the interface card associated with the first stage and the third stage of the first switch fabric portion with respect to the chassis. In other embodiments, each interface card associated with the second stage of the first switch fabric portion can be positioned at an angle that is not orthogonal to the angle of the interface card associated with the first stage and the third stage of the first switch fabric portion with respect to the chassis.

Figure 8:
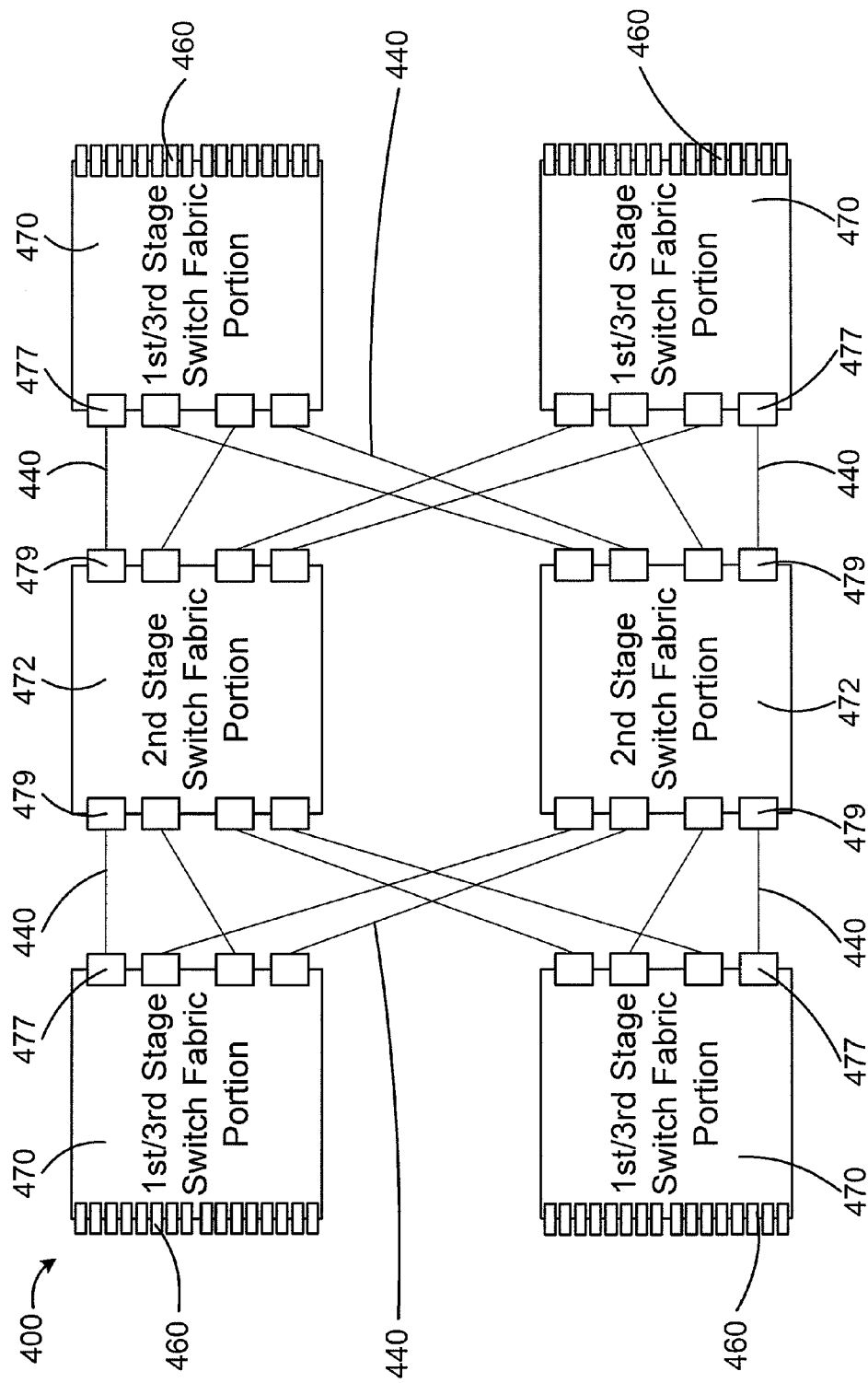
FIG. 8 is a schematic illustration of a switch fabric system, according to another embodiment.

FIGS. 8-13 show an example of a three-stage switch fabric system 400. The three-stage switch fabric system 400 includes multiple 1st/3rd stage switch fabric portions 470, multiple 2nd stage switch fabric portions 472 and multiple cables 440 operatively coupling each 1st/3rd stage switch fabric portion 470 with each 2nd stage switch fabric portion 472. While the three-stage switch fabric system 400 is shown in FIG. 8 as having four 1st/3rd stage switch fabric portions 470 and two 2nd stage switch fabric portions 472, in other embodiments, any number of 1st/3rd stage switch fabric portions and/or 2nd stage switch fabric portions can be used. In some embodiments, for example, the system can include eight 1st/3rd stage switch fabric portions and four 2nd stage switch fabric portions.

Each 1st/3rd stage switch fabric portion 470 and each 2nd stage switch fabric portion 472 are disposed within a separate chassis. Thus, if a switch-fabric system 400 has four 1st/3rd stage switch fabric portions 470 and two 2nd stage switch fabric portions 472, the switch-fabric system 400 includes six chassis. The chassis can be structurally and functionally similar to the chassis 270 shown and described above in relation to the switch fabric system 200.

The cables 440 can be constructed of any material suitable to transfer data between the 1st/3rd stage switch fabric portions 470 and the 2nd stage switch fabric portions 472. In some embodiments, for example, each cable 440 is constructed of multiple optical fibers. In such embodiments, each cable 440 can have thirty-six transmit and thirty-six receive fibers. The thirty-six transmit fibers of each cable 440 can include thirty-two fibers for transmitting data, and four fibers for expanding the data capacity and/or for redundancy. Similarly, the thirty-six receive fibers of each cable 440 have thirty-two fibers for receiving data, and four fibers for expanding the data capacity and/or for redundancy. In other embodiments, any number of fibers can be contained within each cable.

The cables 440 operatively couple each 1st/3rd stage module system 412 within the 1st/3rd stage switch fabric portions 470 with each 2nd stage module system 416 within each 2nd stage switch fabric portion 472, as described in further detail herein. In the embodiment shown in FIG. 8, 1024 cables 440 are used to couple each 1st/3rd stage module system 412 within the 1st/3rd stage switch fabric portions 470 with each 2nd stage module system 416 within each 2nd stage switch fabric portion 472. With 1024 cables 440, two cables are disposed between each 1st/3rd stage switch fabric portion 470 and each 2nd stage switch fabric portion 472, as shown in FIG. 8. In other embodiments, a single cable can be disposed between each 1st/3rd stage switch fabric portion and each 2nd stage switch fabric portion. In still other embodiments, more than two cables can be disposed between each 1st/3rd stage switch fabric portion and each 2nd stage switch fabric portion.

The number of cables 440 used can be determined by the number of connections between the 1st/3rd stage module systems 412 and the 2nd stage module systems 416. In FIG. 8, for example, the three-stage switch fabric system 400 has eight interface cards 416 within each of four 1st/3rd stage switch fabric portions 470 each having four cable connector ports 460 that are coupled to eight interface cards 411 within each 2nd stage switch fabric portion 472 (i.e., 8×4×4×8=1024 cables). Thus, 1024 cables are used for a switch fabric system configured to be coupled to 512 input/output modules. In other embodiments, the number of cables used can be more or less than 1024 based on the number of 1st/3rd stage switch fabric portions and 2nd stage switch fabric portions. For example, a switch fabric system having two 1st/3rd stage switch fabric portions and a single 2nd stage switch fabric portion (and thus configured to be coupled to 256 input/output modules) will use 256 cables.

Moreover, the number of cable connector ports 477, 479 used in the switch fabric system 400 is a function of how many cables 440 are used. For example, in a switch fabric system 400 having 1024 cables, 2048 cable connector ports 477, 479 can be used (1024 cables×2 ends per cable=2048 cable connector ports). In other embodiments, any number of cable connector ports can be used.

Figure 9:
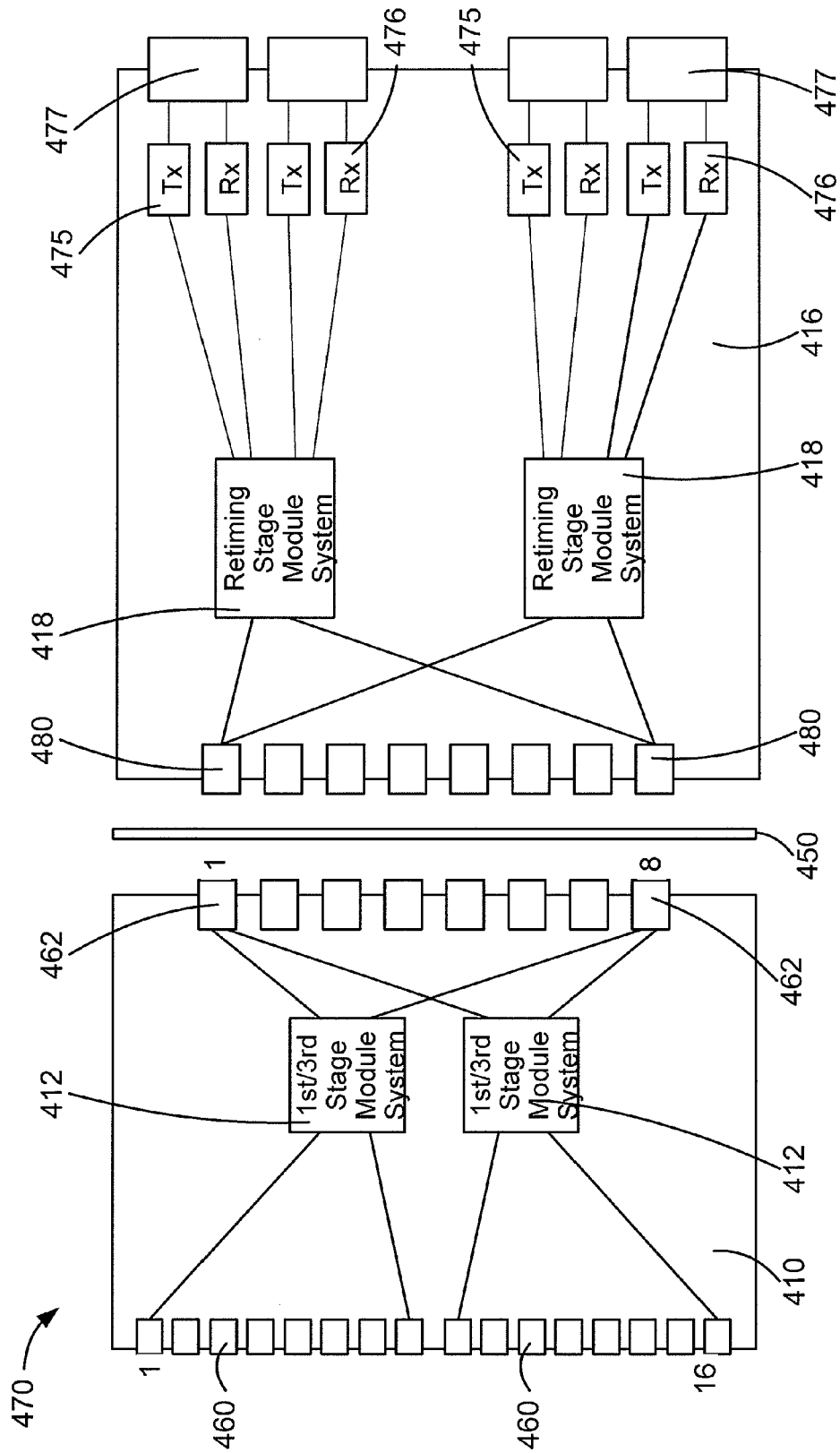
FIG. 9 is a schematic illustration of interface cards of the switch fabric system of FIG. 8 coupled together by a midplane.

FIG. 9 shows a detailed view of a 1st/3rd stage switch fabric portion 470. Each 1st/3rd stage switch fabric portion 470 includes multiple interface cards 410 associated with a first stage and a third stage of the three-stage switch fabric system 400, multiple interface cards 416 associated with a retiming stage of the three-stage switch fabric system 400, and a midplane 450 configured to operatively couple the interface cards 410 to the interface cards 416. In some embodiments, each 1st/3rd stage switch fabric portion 470 includes eight interface cards 410 and eight interface cards 416. In other embodiments, each 1st/3rd stage switch fabric portion 470 includes a different number of interface cards 410 and/or interface cards 416.

The interface card 410 includes multiple cable connector ports 460, 1st/3rd stage module systems 412, and multiple midplane connector ports 462. Each cable connector port 460 of interface card 410 is configured to receive an end of a cable from a set of cables (not shown) operatively coupled to multiple input/output modules (not shown). In some embodiments, for example, the interface card 410 includes sixteen cable connector ports 460. Thus, in such embodiments, sixteen cable connector ports 460 on each of the eight interface cards 410 in a 1st/3rd stage switch fabric portion 470 are used to receive 128 cables (16×8=128) and operatively couple each 1st/3rd stage switch fabric portion 470 to 128 input/output modules (not shown). Accordingly, the three-stage switch fabric system 400 shown in FIG. 8 can include 512 input/output modules. In some embodiments, the three-stage switch fabric system 400 includes 256 input/output modules each coupled to two cable connector ports 460. In such embodiments, the three-stage switch fabric system 400 has redundancy. For example, an input/output module can be coupled to an interface card in a first 1st/3rd stage switch fabric portion and an interface card in a second 1st/3rd stage switch fabric portion. Thus, if a first 1st/3rd stage switch fabric portion of the three-stage switch fabric system 400 fails to operate, the input/output module can still send data through the three-stage switch fabric system 400 via the second 1st/3rd stage switch fabric portion.

While shown in FIG. 9 as having sixteen cable connector ports 460, in other embodiments, any number of cable connector ports can be used such that each input/output module is operatively coupled to a cable connector port. For example, if sixteen interface cards are used, each interface card can include eight cable connector ports.

Figure 11:
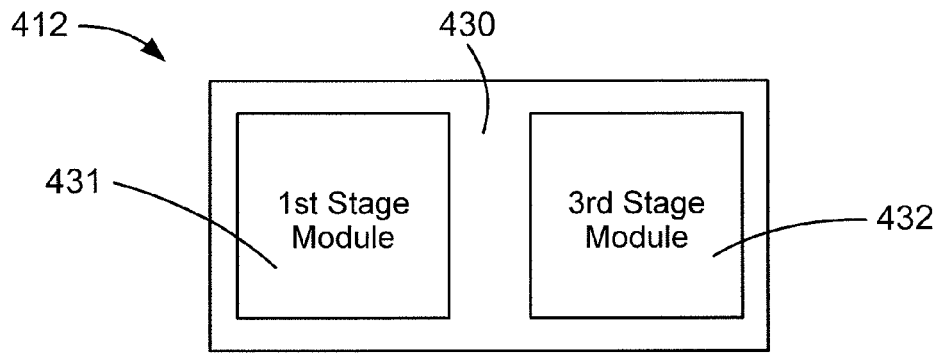
FIG. 11 is a schematic illustration of a 1st/3rd stage module system of the switch fabric system of FIG. 8.

As shown in FIG. 11, the 1st/3rd stage module systems 412 of the interface card 410 include a module associated with the first stage 431 and a module associated with the third stage 432 of the three-stage switch fabric system 400. In some embodiments, eight cable connector ports of the sixteen cable connector ports 460 are operatively coupled to the each 1st/3rd stage module system 412. Both 1st/3rd stage module systems 412 are operatively coupled to every midplane connector port 462 of the interface card 410.

The 1st/3rd stage module systems 412 of the interface card 410 are application-specific integrated circuits (ASICs) or chip packages having multiple ASICs. The 1st/3rd stage module systems 412 are instances of the same ASIC 430 (see FIG. 11). Said another way, the ASIC or chip package of each 1st/3rd stage module system 412 is substantially similar (i.e., the same kind or type) to the ASIC or chip package of other 1st/3rd stage module systems 412. Thus, manufacturing costs can be decreased because multiple instances of a single ASIC and/or chip package can be produced. Further, as shown in FIG. 11, a module associated with the first stage 431 and a module associated with the third stage 432 are included on each ASIC 430 and/or each chip package.

In some embodiments, each midplane connector port 462 has twice the capacity of each cable connector port 460. For example, in some embodiments, the interface card 410 has sixteen cable connector ports 460 and eight midplane connector ports 462. Each cable connector port 460 can receive eight data transmit connections, eight data receive connections, and eight control and/or parity connections. Thus, the sixteen cable connector ports 460 of the interface card 410 collectively include a total of 128 data transmit connections and 128 data receive connections. In such embodiments, each of the eight midplane connector ports 462 within the interface card 410 can contain sixteen data transmit connections and sixteen data receive connections. Thus, the eight midplane connector ports 462 of the interface card 410 collectively include a total of 128 data transmit connections and 128 data receive connections. Accordingly, in such an embodiment, the total bandwidth of the eight midplane connector ports 462 is substantially equivalent to the total bandwidth of the sixteen cable connector ports 460.

In other embodiments, the total bandwidth of the midplane connector ports can be approximately twice the total bandwidth of the cable connector ports. In such embodiments, each midplane connector port can have, for example, thirty-two data transmit connections and thirty-two data receive connections. Thus, the eight midplane connector ports of the interface card collectively include a total of 256 data transmit connections and 256 data receive connections. Accordingly, the midplane connector ports of the interface card can support approximately twice the bandwidth of the cable connector ports.

The eight midplane connector ports 462 of the interface card 410 are connected to the midplane 450. The midplane 450 is configured to connect each interface card 410 to each interface card 416. Thus, the midplane 450 ensures that each midplane connector port 462 of each interface card 410 is operatively coupled to a midplane connector port 480 of a different interface card 416 via the midplane 450. Said another way, no two midplane connector ports of the same interface card 410 are operatively coupled to the same interface card 416. Thus, the midplane 450 allows each interface card 410 to send data to and receive data from any of the interface cards 416.

The interface card 416 includes multiple midplane connector ports 480, retiming stage module systems 418, multiple transmit modules 475, multiple receive modules 476 and multiple cable connector ports 477. The midplane connector ports 480 are configured to send data to and receive data from any of the interface cards 410 within the same 1st/3rd stage switch fabric portion 470 via the midplane 450. In some embodiments, the interface card 416 includes eight midplane connector ports 480 and four cable connector ports 477.

Each retiming stage module system 418 of the interface card 416 is operatively coupled to each midplane connector port 480. Thus, through the midplane 450, each 1st/3rd stage module system 412 is operatively coupled to each retiming stage module system 418. Said another way, each 1st/3rd stage module system 412 can send data to and receive data from any retiming stage module system 418, and vice versa.

The retiming stage of the three-stage switch fabric system 400 is configured to retime and/or multiplex signals as they are sent to and/or received from the other stages of the three-stage switch fabric system 400. The retiming stage module systems 418 of interface card 416 are application-specific integrated circuits (ASICs) or chip packages having multiple ASICs. The retiming stage module systems 418 are instances of the same ASIC 436 (see FIG. 13) or chip package. Said another way, the ASIC or chip package of each retiming stage module system 418 is substantially similar (i.e., the same kind or type) to the ASIC or chip package of other retiming stage module systems 418. In some embodiments, each ASIC 436 or chip package includes two retiming stage modules 437. In other embodiments, each ASIC or chip package includes any number of retiming stage modules. In other embodiments, each retiming stage module system is an instance of the ASIC or chip package used for the 1st/3rd stage module system of the interface card 410. Thus, manufacturing costs can be decreased because multiple instances of a single ASIC and/or chip package can be used for each of the module systems in the 1st/3rd stage switch fabric portion.

The transmit modules 475 are configured to transmit data through a cable connector port 477 and to a 2nd stage switch fabric portion 472, as described in further detail herein. Similarly, the receive modules 476 are configured to receive data from a cable connector port 477 and forward the data to a retiming stage module system 418. The cable connector ports 477 of the interface card 416 are configured to be coupled to the cables 440 (see FIG. 8). This enables the interface card 416 to forward data to and/or receive data from the 2nd stage switch fabric portions 472.

Figure 10:
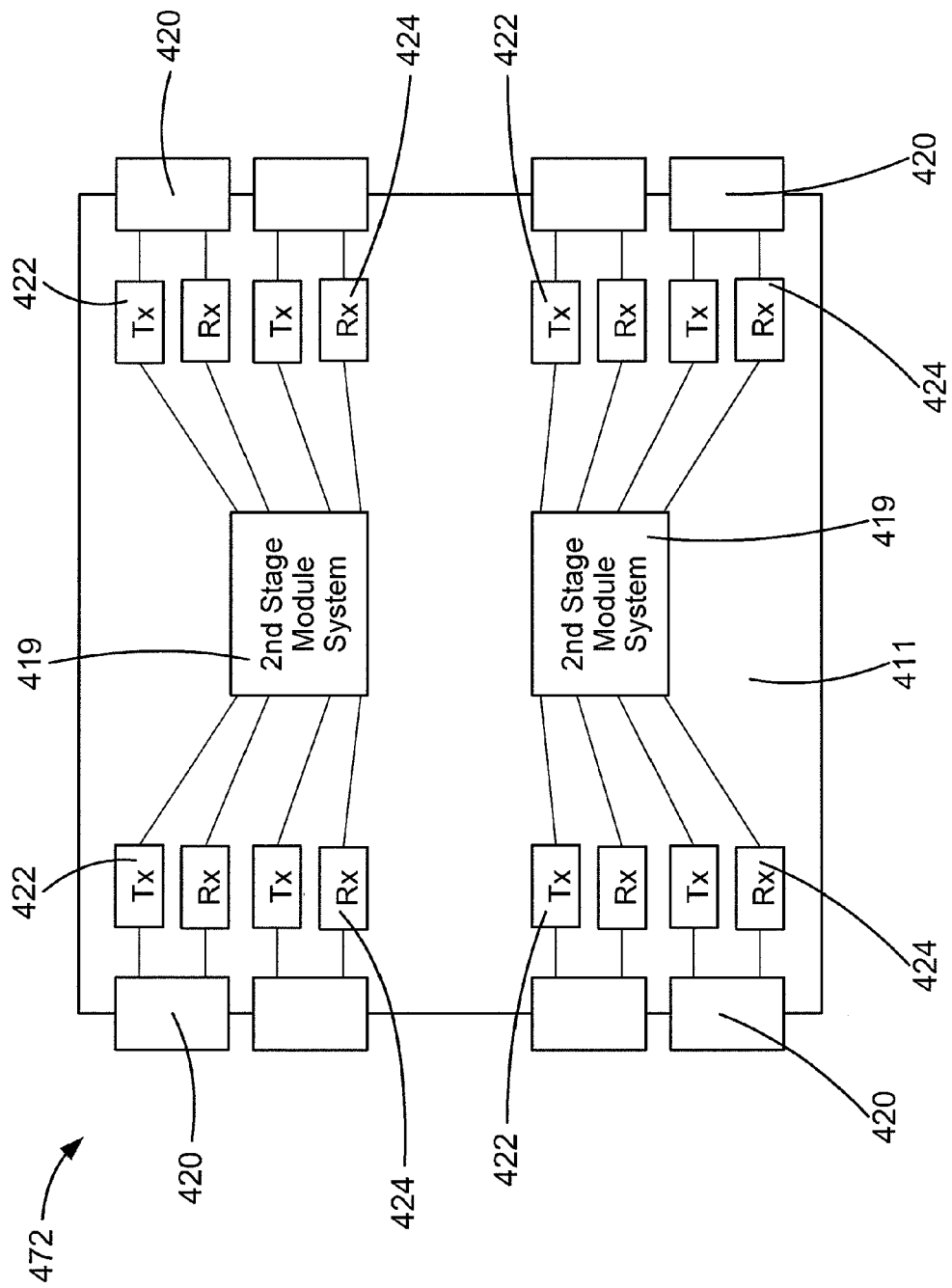
FIG. 10 is a schematic illustration of an interface card of the switch fabric system of FIG. 8.

FIG. 10 shows a detailed view of a 2nd stage switch fabric portion 472. Each 2nd stage switch fabric portion 472 includes multiple interface cards 411 associated with a second stage of the three-stage switch fabric system 400. In some embodiments, each 2nd stage switch fabric portion 472 includes eight interface cards 411. In other embodiments, each 2nd stage switch fabric portion includes a different number of interface cards.

The interface card 411 includes multiple cable connector ports 420, 2nd stage module systems 419, multiple transmit modules 422 and multiple receive modules 424. Each cable connector port 420 of interface card 411 is configured to receive an end of a cable 440 operatively coupled to a 1st/3rd stage switch fabric portion 470. In some embodiments, for example, the interface card 410 includes eight cable connector ports 420. In other embodiments, any number of cable connector ports can be used, such that each 2nd stage module system is operatively coupled to each 1st/3rd stage module system.

Figure 12:
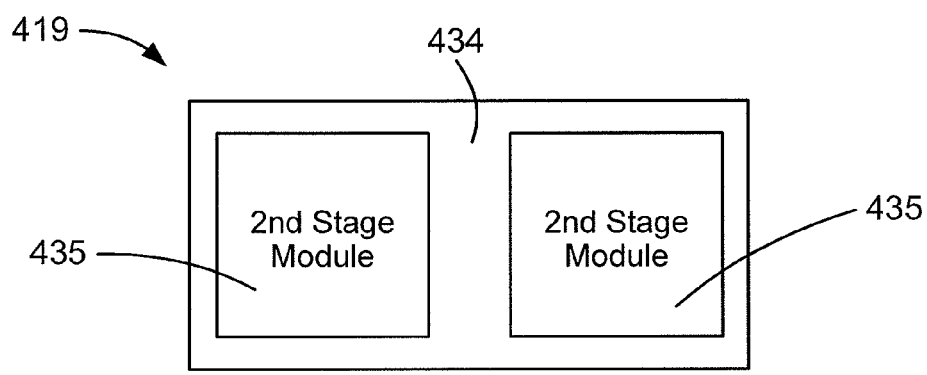
FIG. 12 is a schematic illustration of a 2nd stage module system of the switch fabric system of FIG. 8.
Figure 13:
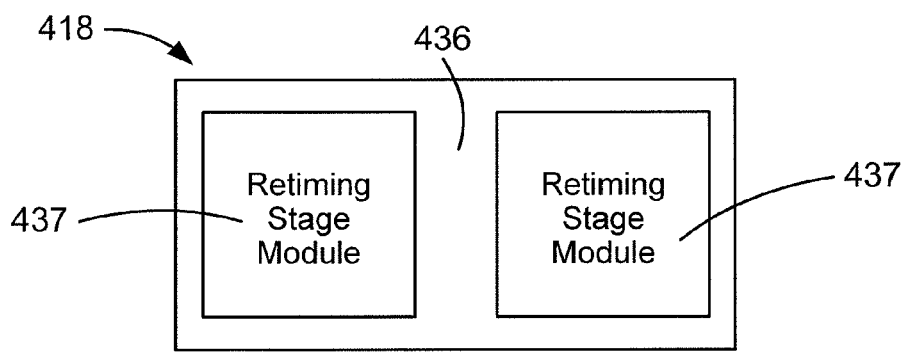
FIG. 13 is a schematic illustration of a retiming stage module system of the switch fabric system of FIG. 8.

As shown in FIG. 12, the 2nd stage module systems 419 of the interface card 411 include two modules associated with the second stage 435 of the three-stage switch fabric system 400. The 2nd stage module systems 419 of the interface card 411 are application-specific integrated circuits (ASICs) or chip packages having multiple ASICs. Each 2nd stage module system 419 is an instance of the same ASIC 434 or chip package (see FIG. 12). Said another way, the ASIC or chip package of each 2nd stage module system 419 is substantially similar (i.e., the same kind or type) to the ASIC or chip package of other 2nd stage module systems 419. Thus, manufacturing costs can be decreased because multiple instances of a single ASIC or chip package can be produced. Further, as shown in FIG. 12, two modules associated with the second stage 435 are included on each ASIC 430 or chip package. In other embodiments, any number of modules associated with the second stage can be included in each 2nd stage module system. In still other embodiments, each 2nd stage module system is an instance of the ASIC or chip package used for the 1st/3rd stage module systems.

The transmit modules 422 are configured to transmit data through a cable connector port 420 and to a 1st/3rd stage switch fabric portion 470, as described in further detail herein. Similarly, the receive modules 424 are configured to receive data from a cable connector port 420 and forward the data to a 2nd stage module system 419.

Each 2nd stage module system 419 is operatively coupled to each 1st/3rd stage module system 412 via the retiming stage module systems 418 and the midplane 450. Thus, each module associated with the first stage can send data to any module associated with the second stage. Similarly, each module associated with the second stage can send data to any module associated with the third stage.

In use, data is transferred from a first input/output module (not shown in FIGS. 8-13) to a second input/output module (not shown in FIGS. 8-13) via the three-stage switch fabric system 400. The first input/output module sends data into a 1st/3rd stage switch fabric portion 470 via a cable (not shown). The data passes through a cable connector port 460 of one of the interface cards 410 and into a module associated with the first stage within a 1st/3rd stage module system 412.

The module associated with the first stage within the 1st/3rd stage module system 412 forwards the data to a retiming stage module within a retiming stage module system 418 by sending the data through one of the midplane connector ports 462 of the interface card 410, through the midplane 450, and to one of the interface cards 416. The data enters the interface card 416 through a midplane connector port 480 of the interface card 416. The data is then sent to the retiming stage module within a retiming stage module system 418.

The retiming stage module within the retiming stage module system 418 sends the data to a module associated with the second stage within a 2nd stage module system 419 via a transmit module 475 and a cable connector port 477 of the interface card 416, a cable 440, and a cable connector port 420 and a receive module 424 of an interface card 411.

The module associated with the second stage determines how the second input/output module is connected and redirects the data back to a module associated with the third stage within a 1st/3rd stage module system 412. Because each 2nd stage module system 419 is operatively coupled to each 1st/3rd stage module system 412, the module associated with the second stage within the 2nd stage module system 419 can determine which module associated with the third stage within a 1st/3rd stage module system 412 is operatively coupled to the second input/output module and send the data accordingly.

The data is sent from the module associated with the second stage within the 2nd stage module system 419 to the module associated with the third stage within a 1st/3rd stage module system 412 via a cable 440, a retiming stage module system 418, and the midplane 450. The module associated with the third stage then sends the data to the second input/output module via a cable coupled to a cable connector port 460.

In other embodiments, instead of the module associated with the first stage sending the data to a single module associated with the second stage, the data is separated into separate portions (e.g., cells) and the module associated with the first stage forwards a portion of the data to each module associated with the second stage to which the module associated with the first stage is operatively coupled (e.g., in this embodiment, every module associated with the second stage receives a portion of the data). Each module associated with the second stage then determines how the second input/output module is connected and redirects the portions of the data back to a single module associated with the third stage. The received portions of the data are then reconstructed and sent to the second input/output module.

Figure 14:
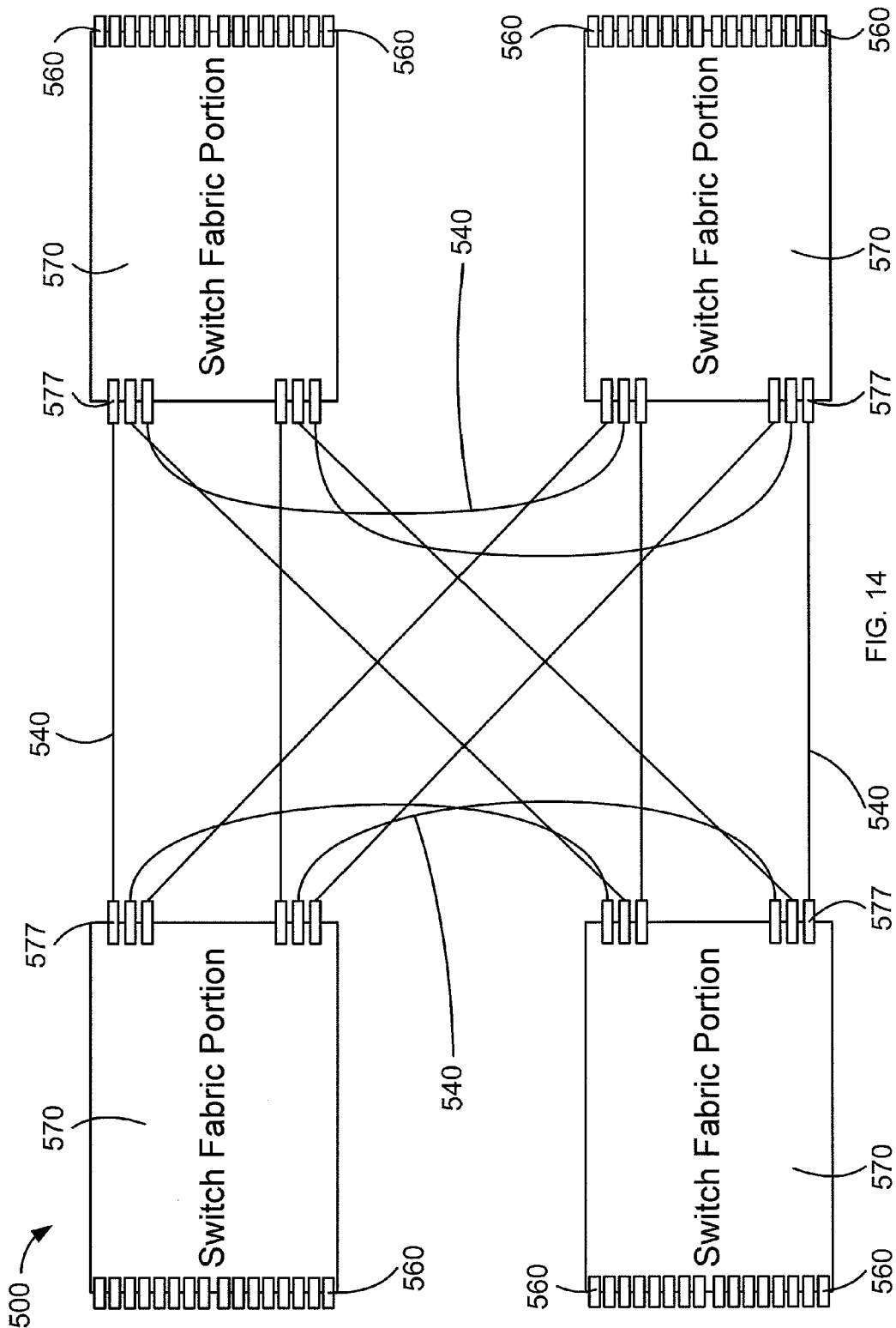
FIG. 14 is a schematic illustration of a switch fabric system, according to another embodiment.
Figure 15:
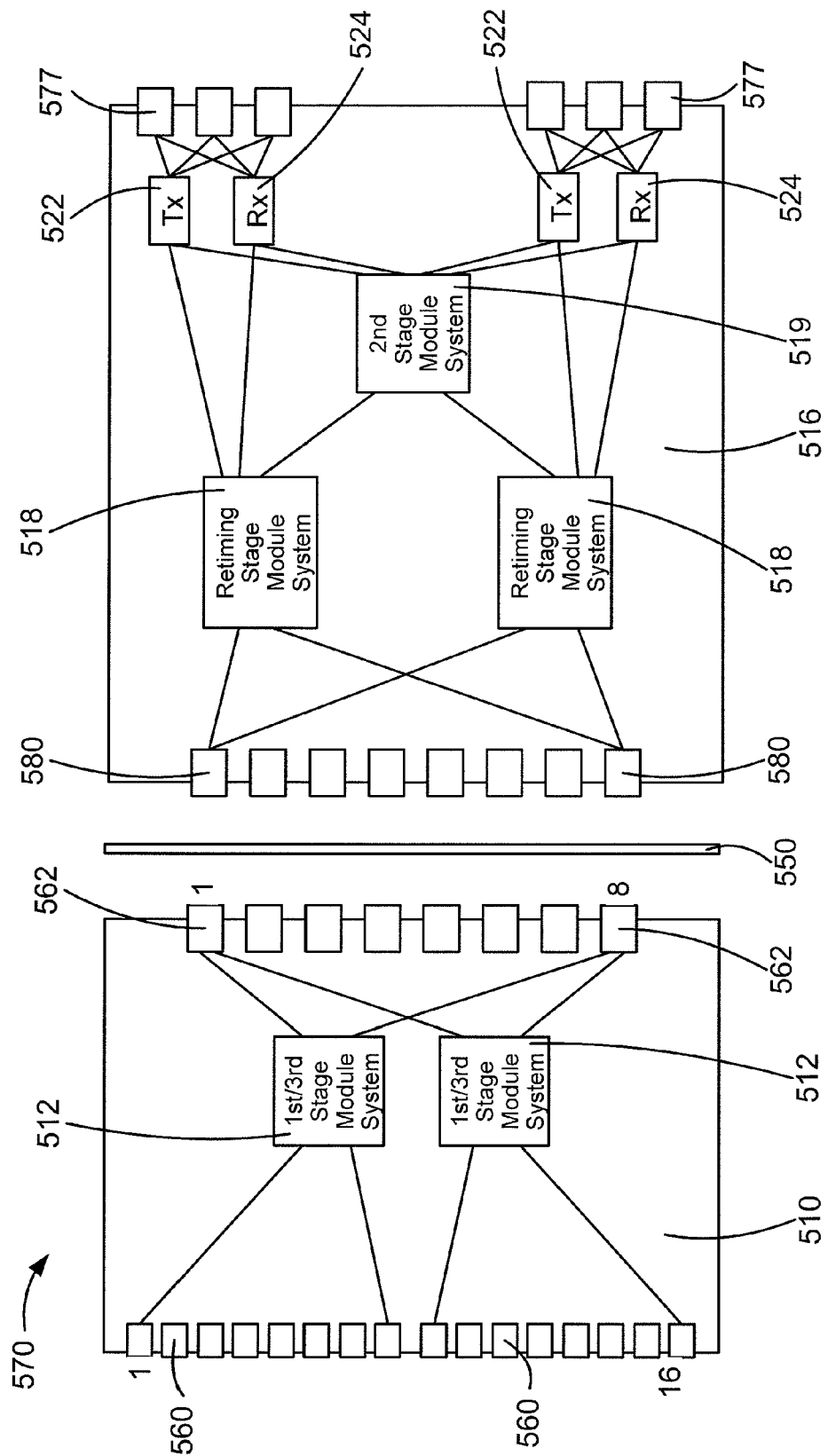
FIG. 15 is a schematic illustration of interface cards of the switch fabric system of FIG. 14 coupled together by a midplane.

FIGS. 14 and 15 show a three-stage switch fabric system 500 that uses less cables than the three-stage switch fabric system 400. The three-stage switch fabric system 500 includes multiple switch fabric portions 570 operatively coupled to each other by multiple cables 540. While the three-stage switch fabric system 500 is shown in FIG. 14 as having four switch fabric portions 570, in other embodiments, any number of switch fabric portions can be used. In some embodiments, for example, the three-stage switch fabric system can include eight switch fabric portions. In yet other embodiments, because each switch fabric portion includes every stage of the three-stage switch fabric (i.e., each switch fabric portion includes modules associated with a first stage, modules associated with a second stage and modules associated with a third stage), as further described in detail herein, the three-stage switch fabric system includes a single switch fabric portion without any cables.

Each switch fabric portion 570 is disposed within a separate chassis. Thus, if a switch-fabric system 500 has four fabric portions 570, the switch-fabric system 500 includes four chassis. The chassis can be structurally and functionally similar to the chassis 270 shown and described above in relation to the switch fabric system 200.

The cables 540 can be constructed of any material suitable to transfer data between the switch fabric portions 570. In some embodiments, for example, each cable 540 is constructed of multiple optical fibers. In such an embodiment, each cable 540 can have thirty-six transmit and thirty-six receive fibers. The thirty-six transmit fibers of each cable 440 can include thirty-two fibers for transmitting data, and four fibers for expanding the data capacity and/or for redundancy. Similarly, the thirty-six receive fibers of each cable 540 have thirty-two fibers for receiving data, and four fibers for expanding the data capacity and/or for redundancy. In other embodiments, any number of fibers can be contained within each cable.

The cables 540 operatively couple each 1st/3rd stage module system 512 within the switch fabric portions 570 with each 2nd stage module system 519 within the other switch fabric portion 570, as described in further detail herein. In the embodiment shown in FIG. 14, 768 cables 540 are used to couple each switch fabric portion 570 with every other switch fabric portion 570. With 768 cables, two cables are disposed between each switch fabric portion 540 and the other switch fabric portions 540, as shown in FIG. 14. In other embodiments, a single cable can be disposed between each switch fabric portion and the other switch fabric portions. In still other embodiments, more than two cables can be disposed between each switch fabric portion and the other switch fabric portions.

FIG. 15 shows a detailed view of a switch fabric portion 570. Each switch fabric portion 570 includes multiple interface cards 510 associated with a first stage and a third stage of the three-stage switch fabric system 500, multiple interface cards 516 associated with a retiming stage and a second stage of the three-stage switch fabric system 500, and a midplane 550 configured to operatively couple the interface cards 510 with the interface cards 516. In some embodiments, each switch fabric portion 570 includes eight interface cards 510 and eight interface cards 516. In other embodiments, each switch fabric portion 570 includes a different number of interface cards 510 and/or interface cards 516.

Each interface card 510 includes multiple cable connector ports 560, 1st/3rd stage module systems 512, and multiple midplane connector ports 562. The multiple cable connector ports 560, the 1st/3rd stage module systems 512 and the multiple midplane connector ports 562 are structurally and functionally similar to the cable connector ports 460, the 1st/3rd stage module systems 412 and the multiple midplane connector ports 462 of the interface card 410 shown and described above. Accordingly, the multiple cable connector ports 560, the 1st/3rd stage module systems 512 and the multiple midplane connector ports 562 are not described in detail herein.

The eight midplane connector ports 562 of the interface card 510 are connected to the midplane 550. The midplane 550 is configured to connect each interface card 510 to each interface card 516. Thus, the midplane 550 ensures that each midplane connector port 562 of each interface card 510 is operatively coupled to a midplane connector port 580 of a different interface card 516 via the midplane 550. Said another way, no two midplane connector ports of the same interface card 510 are operatively coupled to the same interface card 516. Thus, the midplane 550 allows each interface card 510 to send data to and receive data from any of the interface cards 516.

The interface card 516 includes multiple midplane connector ports 580, retiming stage module systems 518, a 2nd stage module system 519, multiple transmit modules 522, multiple receive modules 524 and multiple cable connector ports 577. The midplane connector ports 580 are configured to send data to and receive data from any of the interface cards 510 within the same switch fabric portion 570 via the midplane 550. In some embodiments, the interface card 516 includes eight midplane connector ports 580 and six cable connector ports 577.

Each retiming stage module system 518 of the interface card 516 is operatively coupled to each midplane connector port 580. Thus, through the midplane 550, each 1st/3rd stage module system 512 is operatively coupled to each retiming stage module system 518. Said another way, each 1st/3rd stage module system 512 can send data to and receive data from any retiming stage module system 518, and vice versa.

The retiming stage of the three-stage switch fabric system 500 is configured to retime and/or multiplex signals as they are sent to and/or received from the other stages of the three-stage switch fabric system 500. The retiming stage module systems 518 of interface card 516 are application-specific integrated circuits (ASICs) or chip packages having multiple ASICs. The retiming stage module systems 518 are instances of the same ASIC or chip package. Said another way, the ASIC or chip package of each retiming stage module system 518 is substantially similar (i.e., the same kind or type) to the ASIC or chip package of other retiming stage module systems 518. In some embodiments, each ASIC or chip package includes two retiming stage modules. In other embodiments, each ASIC or chip package includes any number of retiming stage modules. In other embodiments, each retiming stage module system is an instance of the ASIC or chip package used for the 1st/3rd stage module system. Thus, manufacturing costs can be decreased by using multiple instances of a single ASIC or chip package for multiple components of the system.

The retiming stage module systems 518 are operatively coupled to the 2nd stage module system 519, the transmit modules 522 and the receive modules 524. Accordingly, the retiming stage module systems 518 can send data to the 2nd stage module system 519 or a transmit module 522. Similarly, the retiming stage module systems 518 can receive data from both the 2nd stage module system 519 and the receive module 524.

The 2nd stage module system 519 of the interface card 516 includes two modules associated with the second stage of the three-stage switch fabric system 500. The 2nd stage module system 519 of the interface card 516 is an application-specific integrated circuit (ASIC) or a chip package having multiple ASICs. Each 2nd stage module system 519 is an instance of the same ASIC or chip package. Said another way, the ASIC or chip package of each 2nd stage module system 519 is substantially similar (i.e., the same kind or type) to the ASIC or chip package of other 2nd stage module systems 519. Thus, manufacturing costs can be decreased because multiple instances of a single ASIC or a single chip package can be produced. Similar to the 2nd stage module system 419 shown and described above, two modules associated with the second stage are included on each ASIC or chip package. In other embodiments, any number of modules associated with the second stage can be included in each 2nd stage module system. In still other embodiments, each 2nd stage module system is an instance of the ASIC or chip package used for the 1st/3rd stage module system and/or the retiming stage module system.

The 2nd stage module system 519 is coupled to the transmit modules 522 and the receive modules 524. Accordingly, the 2nd stage module system 519 is configured to send data to the transmit modules 522 and receive data from the receive modules 524.

The transmit modules 522 are configured to transmit data through a cable connector port 577 and to another switch fabric portion 570, as described in further detail herein. Similarly, the receive modules 524 are configured to receive data from a cable connector port 577 and forward the data to either a 2nd stage module system 519 or a retiming stage module system 518.

The cable connector ports 577 of the interface card 516 are configured to be coupled to the cables 540 (see FIG. 14). This enables the interface card 516 to forward data to and/or receive data from the other switch fabric portions 570.

As shown in FIG. 15 and as described above, each switch fabric portion 570 is disposed within a separate chassis and includes modules associated with every stage within the switch fabric system 500. Said another way, each chassis houses a switch fabric portion 570 having modules associated with the first stage of the switch fabric system 500, modules associated with the second stage of the switch fabric system 500 and modules associated with the third stage of the switch fabric system 500. Having a module associated with each stage of the switch fabric system 500 in each chassis within the switch fabric system 500 reduces the number of cables used to connect the separate chassis to the other chassis.

The number of cables 540 used is a function of the number of connections between the switch fabric portions 570. In FIG. 14, for example, the three-stage switch fabric system 500 has eight interface cards 516 within each of four switch fabric portions 570. The eight interface cards 516 each have six cable connector ports 560 that are coupled to six other cable connector ports 560 of another switch fabric portion 570. Thus, to operatively couple four interface cards to each other (one from each of the four switch fabric portions 570), 12 cables are used (see FIG. 14). Accordingly, to operatively couple eight interface cards of a first switch fabric portion to each of the eight interface cards of the other switch fabric portions, up to 768 cables are used (i.e., 12×8×8=768 cables). Thus, up to 768 cables can be used for a three-stage switch fabric system 500 configured to be coupled to 512 input/output modules. Accordingly, the number of cables 540 used in the three-stage switch fabric system 500 (768) is twenty-five percent less than the number of cables 440 used in the three-stage switch fabric system 400 (1024) having the same number of input/output modules (512).

Moreover, the number of cable connector ports 577 used in the switch fabric system 500 is a function of the number of cables 540 used. For example, in a switch fabric system 500 having 768 cables, 1536 cable connector ports 577 can be used (768 cables×2 ends per cable=1536 cable connector ports). Thus, the number of cable connector ports 577 used in the three-stage switch fabric system 500 (1536) is twenty-five percent less than the number of cable connector ports 477, 479 used in the three-stage switch fabric system 400 (2048) having the same number of input/output modules (512). In other embodiments, any number of cable connector ports can be used.

In other embodiments, the number of cables used can be more or less than 768 based on the number of switch fabric portions within the system. For example, a system having two switch fabric portions (and thus configured to be coupled to up to 256 input/output modules) can use up to 128 cables. Thus, the number of cables used in the system (128) is half the number of cables used in a system constructed similar to the three-stage switch fabric system 400 (256) having the same number of input/output modules.

Having a module associated with each stage of the switch fabric system 500 in each chassis within the switch fabric system 500 also allows each switch fabric portion 570 to operate as a stand-alone switch fabric. In some embodiments, for example, 128 input/output modules can be connected to the switch fabric portion 570. Such a system can be expanded by connecting additional switch fabric portions 570 to the switch fabric portion 570 by cables 540. For example, the system can be expanded to include 256 input/output modules by connecting an additional one switch fabric portion 570 to the existing switch fabric portion 570. Further, the system can be expanded to include 512 input/output modules by connecting an additional three switch fabric portions 570 to the existing switch fabric portion 570 (as shown in FIG. 14). Because each switch fabric portion 570 includes every stage of the three-stage switch fabric (i.e., modules associated with the first stage, the second stage and the third stage), each switch fabric portion 570 can continue operation while being coupled to the other switch fabric portions 570 by the cables. Accordingly, substantially no downtime is needed to expand the system to include additional input/output modules. In other embodiments, any number of switch fabric portions can be coupled to the system and/or removed from the system while the system continues to operate.

Further, if one of four switch fabric portions 570 fails to operate in a desirable fashion, the other three can continue to operate as a three-stage switch fabric system 500 having three switch fabric portions 570. Thus, only 25% of the throughput of the system is affected. This can be contrasted with the three-stage switch fabric system 400 where 50% of the throughput of the system is affected if a 2nd stage switch fabric portion 472 failed to operate in a desirable fashion. Additionally, if one or more switch fabric portions 570 fail to operate in a desirable fashion, a single switch fabric portion 570 can operate as a stand-alone switch fabric system 500. This enables at least a portion of the overall three-stage switch fabric system 500 to continue to operate when other portions fail.

In use, data is transferred from a first input/output module (not shown in FIGS. 14-15) to a second input/output module (not shown in FIGS. 14-15) via the three-stage switch fabric system 500. The first input/output module sends data into a switch fabric portion 570 via a cable (not shown in FIGS. 14-15). The data passes through a cable connector port 560 of one of the interface cards 510 and into a module associated with the first stage within a 1st/3rd stage module system 512.

The module associated with the first stage within the 1st/3rd stage module system 512 forwards the data to a retiming stage module within a retiming stage module system 518 by sending the data through one of the midplane connector ports 562 of the interface card 510, through the midplane 550, and to one of the interface cards 516. The data enters the interface card 516 through a midplane connector port 580 of the interface card 516. The data is then sent to the retiming stage module within a retiming stage module system 518.

The retiming stage module within the retiming stage module system 518 sends the data to a module associated with the second stage within a 2nd stage module system 519. The retiming stage module can send the data to the 2nd stage module system 519 on the same interface card 516 as the retiming stage module system 518 or to a 2nd stage module system 519 within another switch fabric portion 570. If the retiming stage module sends the data to the 2nd stage module system 519 on the same interface card 516 as the retiming stage module system 518, the retiming stage module sends the data directly to the 2nd stage module system 519. If the retiming stage module sends the data to a 2nd stage module system 519 within another switch fabric portion 570, the retiming stage module sends the data to the 2nd stage module system 519 via a transmit module 522, a cable connector port 577, a cable 540, a cable connector port 577 on another interface card 516 in the other switch fabric portion 570 and a receive module 524 within the other switch fabric portion 570.

The module associated with the second stage determines how the second input/output module is connected and redirects the data back to a module associated with the third stage within a 1st/3rd stage module system 512. Because each 2nd stage module system 519 is operatively coupled to each 1st/3rd stage module system 512, the module associated with the second stage within the 2nd stage module system 519 can determine which module associated with the third stage within a 1st/3rd stage module system 512 is operatively coupled to the second input/output module and send the data accordingly. Thus, the 2nd stage module system 519 can send the data to the 1st/3rd stage module systems 512 that are within the same switch fabric portion 570 or the 1st/3rd stage module systems 512 that are within other switch fabric portions 570.

If the destination 1st/3rd stage module system 512 is within the same switch fabric portion 570 as the 2nd stage module system 519, the 2nd stage module system 519 sends the data to the 1st/3rd stage module system 512 via a retiming stage module system 518, a midplane connector port 580, a midplane 550, and a midplane connector port 562. If the destination 1st/3rd stage module system 512 is within another switch fabric portion 570, the 2nd stage module system 519 sends the data to the 1st/3rd stage module system 512 via a transmit module 522 and a cable connector port 577 within the switch fabric portion 570, via a cable 540, and then via a cable connector port 577, a receive module 524, a retiming stage module system 518, a midplane connector port 580, a midplane 550, and a midplane connector port 562 within the other switch fabric portion 570. The module associated with the third stage then sends the data to the second input/output module via a cable (not shown in FIGS. 14-15) coupled to a cable connector port 560.

In other embodiments, instead of the module associated with the first stage sending the data to a single module associated with the second stage, the data is separated into separate portions (e.g., cells) and the module associated with the first stage forwards a portion of the data to each module associated with the second stage to which the module associated with the first stage is operatively coupled (e.g., in this embodiment, every module associated with the second stage in every switch fabric portion receives a portion of the data). Each module associated with the second stage then determines how the second input/output module is connected and redirects the portions of the data back to a single module associated with the third stage. The received portions of the data are then reconstructed and sent to the second input/output module.

The data is sent from the first input/output module to the second input/output module at any suitable rate. In some embodiments, for example, the data is sent from the first input/output module to the second input/output module at a rate of approximately 10 Tb/s. In other embodiments, the data is sent from the first input/output module to the second input/output module at a rate higher or lower than 10 Tb/s.

Figure 16:
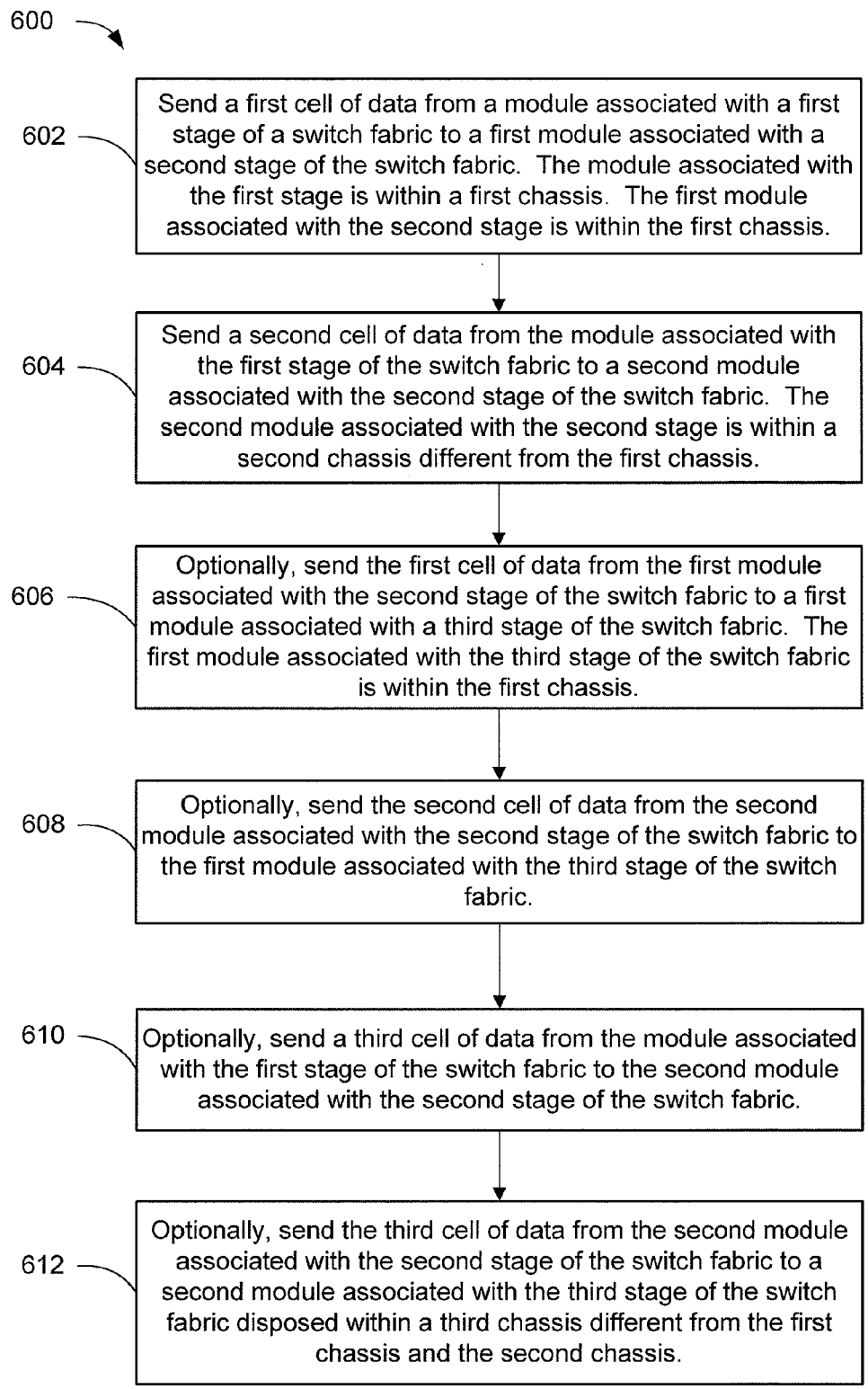
FIG. 16 is a flow chart illustrating a method of sending data through a switch fabric, according to another embodiment.

FIG. 16 is a method 600 of sending data within a switch fabric, according to an embodiment. The method 600 includes sending a first cell of data from a module associated with a first stage of a switch fabric to a first module associated with a second stage of the switch fabric, at 602. The module associated with the first stage and the first module associated with the second stage are within a first chassis. The switch fabric can be similar to the other switch fabrics shown and described herein. The first chassis can be structurally and functionally similar to the chassis of the other embodiments shown and described herein.

A second cell of data is then sent from the module associated with the first stage of the switch fabric to a second module associated with the second stage of the switch fabric, at 604. The second module associated with the second stage is within a second chassis different from the first chassis. The second chassis can be functionally and structurally similar to the first chassis.

The first cell of data is optionally sent from the first module associated with the second stage of the switch fabric to a first module associated with a third stage of the switch fabric, at 606. The first module associated with the third stage of the switch fabric is within the first chassis. The second cell of data is then optionally sent from the second module associated with the second stage of the switch fabric to the first module associated with the third stage of the switch fabric, at 608.

A third cell of data is optionally sent from the module associated with the first stage of the switch fabric to the second module associated with the second stage of the switch fabric, at 610. The third cell of data is then optionally sent from the second module associated with the second stage of the switch fabric to a second module associated with the third stage of the switch fabric disposed within a third chassis different from the first chassis and the second chassis, at 612.

Figure 17:
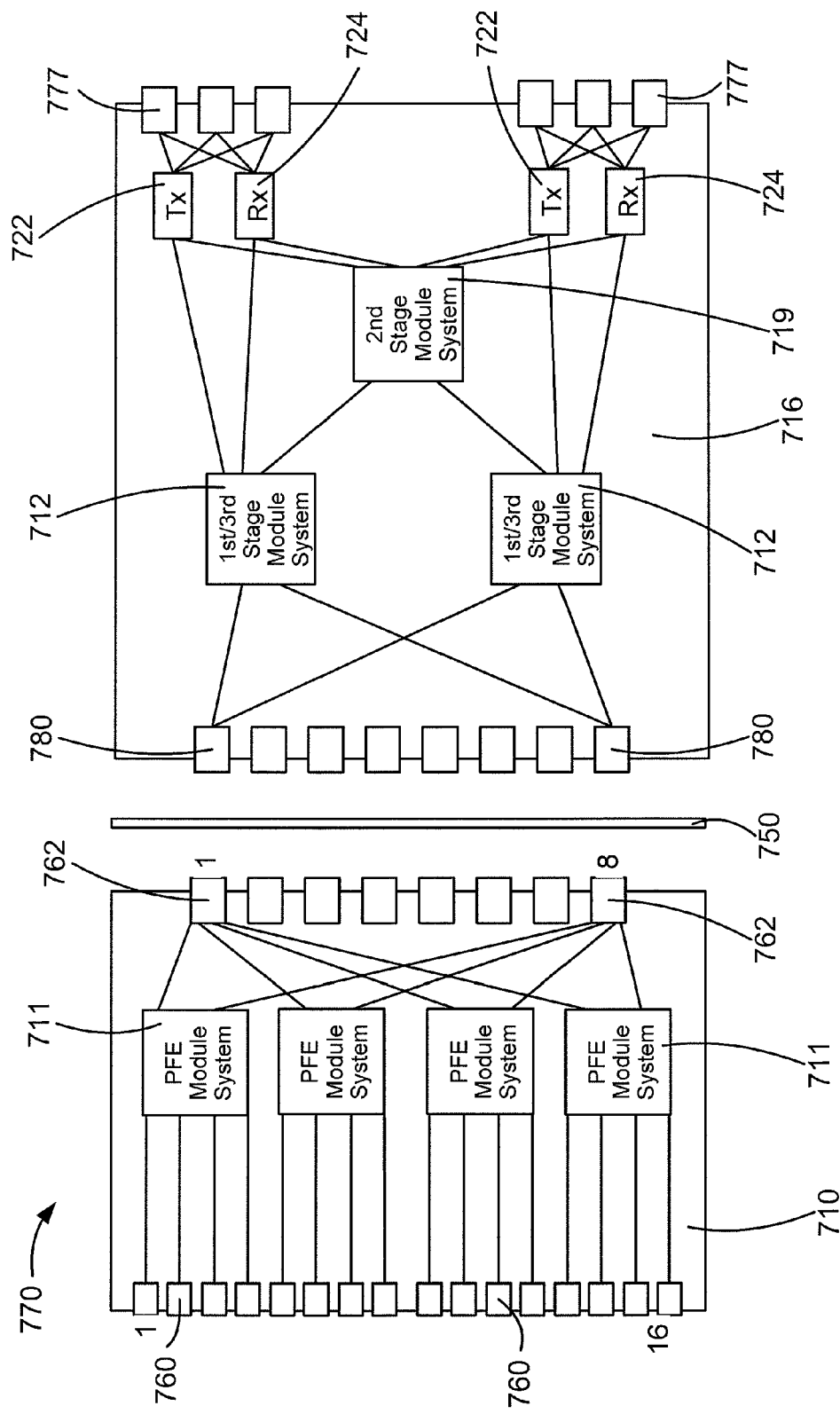
FIG. 17 is a schematic illustration of interface cards of a switch fabric system coupled together by a midplane, according to another embodiment.

In some embodiments, 1st/3rd stage module systems can be included on the same interface card as one or more 2nd stage module systems and can be housed within the same chassis as at least one packet forwarding engine (PFE) module system configured to perform a parsing function, a classifying function, a forwarding function, and a queuing-and-scheduling function. FIG. 17, for example, is a schematic illustration of a switch fabric portion 770 having interface cards 710, 716 of a three-stage switch fabric system coupled together by a midplane 750, according to another embodiment.

The switch fabric portion 770 can operate as a stand-alone three-stage switch fabric system or can be coupled to other switch fabric portions 770 to define a larger three-stage switch fabric system similar to that shown and described with respect to FIG. 14. Accordingly, multiple switch fabric portions 770 can be operatively coupled to each other similar to the switch fabric portions 570 in FIG. 14.

The switch fabric portion 770 includes multiple interface cards 710 associated with a PFE of the three-stage switch fabric system, multiple interface cards 716 associated with a first stage, a second stage and a third stage of the three-stage switch fabric system, and a midplane 750 configured to operatively couple the interface cards 710 with the interface cards 716. In some embodiments, the switch fabric portion 770 includes eight interface cards 710 and eight interface cards 716. In other embodiments, the switch fabric portion 770 includes a different number of interface cards 710 and/or interface cards 716.

Each interface card 710 includes multiple cable connector ports 760, PFE module systems 711, and multiple midplane connector ports 762. The multiple cable connector ports 760 and the multiple midplane connector ports 762 are structurally and functionally similar to the cable connector ports 460 and the midplane connector ports 462 of the interface card 410 shown and described above. Accordingly, the multiple cable connector ports 760 and the multiple midplane connector ports 762 are not described in detail herein.

Figure 18:
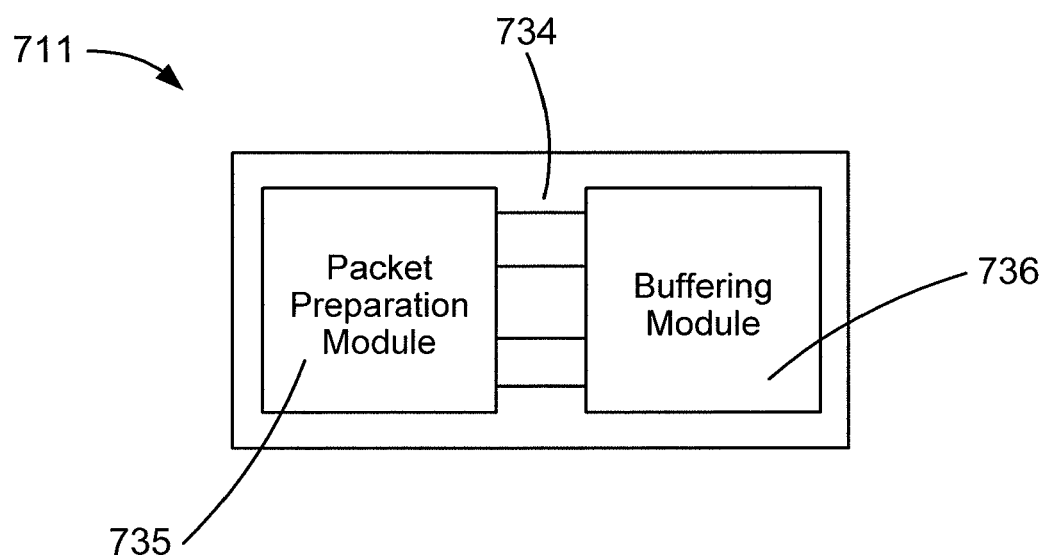
FIG. 18 is a schematic illustration of a packet forwarding engine module system of the switch fabric system of FIG. 17.

As shown in FIG. 18, each PFE module system 711 of the interface card 710 includes a packet preparation module 735 and a buffering module 736. In some embodiments, four cable connector ports of the sixteen cable connector ports 760 are operatively coupled to the each PFE module system 711. In other embodiments, any number of cable connector ports can be operatively coupled to each PFE module system. Each PFE module system 711 is operatively coupled to every midplane connector port 762 of the interface card 710. In other embodiments, each PFE module system is operatively coupled to any number of midplane connector ports of the interface card.

The packet preparation module 735 of the PFE module system 711 includes at least one processor configured to perform a parsing function, a classifying function, a forwarding function, and a queuing-and-scheduling function. Thus, packet parsing, packet classifying, packet forwarding, and packet queuing-and-scheduling all occur within the interface card 710 prior to the data reaching the module associated with the first stage of the three-stage switch fabric system within the 1st/3rd stage module system 712. Accordingly, these functions do not need to be performed at each stage of the switch fabric, and each module of the switch fabric portion does not need to include capabilities to perform these functions. This reduces the cost, power consumption, cooling requirements and the physical area required for each module of the three-stage switch fabric system. In other embodiments, the packet preparation module includes a processor configured to perform any number of the parsing, classifying, a forwarding, and/or queuing-and-scheduling functions.

The latency associated with the three-stage switch fabric system is reduced because the parsing, classifying, forwarding and queuing-and-scheduling functions do not need to be performed at each stage of the switch fabric. In some embodiments, for example, the end-to-end latency (i.e., time it takes to send data from a PFE module system to another PFE module system through the stages of the three-stage switch fabric system) can be lower than the end-to-end latency of a three-stage switch fabric system using an Ethernet protocol. In some embodiments, the throughput of the switch fabric system is constrained substantially only by the connection density of the switch fabric system and not by power and thermal limitations.

Additionally, in some embodiments, the source packet preparation module 735 receives data from an input/output module and separates the data into smaller portions (e.g., cells) to be sent to another input/output module through the stages of the three-stage switch fabric system. In such embodiments, the destination packet preparation module 735 receives the data cells from the third stage of the three-stage switch fabric system and reassembles them before sending the data to the receiving input/output module.

The parsing function, classifying function, forwarding function, and queuing-and-scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties. In the embodiments shown and described above, these functions were performed within the input/output modules but it should be understood that these functions can be performed in the packet preparation module as described above.

The buffering module 736 of the PFE module system 711 is operatively coupled to the packet preparation module 735 and includes a memory buffer configured to store data received from the packet preparation module 735. The data is stored in the memory buffer 735 until the buffering module 736 determines that the module associated with the first stage of the three-stage switch fabric system is ready to receive and route the data through the stages of the three-stage switch fabric system. Additionally, in some embodiments, the buffering module 736 receives data from a module associated with the third stage of the three-stage switch fabric system and stores the data until the packet preparation module 735 is ready to receive the data. Accordingly, the buffering module 736 operates to control the flow of data into and out of the stages of the three-stage switch fabric system.

The PFE module systems 711 of the interface card 710 can be application-specific integrated circuits (ASICs) or chip packages having multiple ASICs. The PFE module systems 711 can be instances of the same ASIC 734 (see FIG. 18) or chip package. Said another way, the ASIC or chip package of each PFE module system 711 can be substantially similar (i.e., the same kind or type) to the ASIC or chip package of other PFE module systems 711. Thus, manufacturing costs can be decreased because multiple instances of a single ASIC and/or chip package can be produced. Further, as shown in FIG. 18, a packet preparation module 735 and a buffering module 736 are included on each ASIC 734 and/or each chip package. In other embodiments, each PFE module system includes multiple ASICs and/or chip packages.

The eight midplane connector ports 762 of the interface card 710 are connected to the midplane 750. The midplane 750 is configured to connect each interface card 710 to each interface card 716. Thus, the midplane 750 ensures that each midplane connector port 762 of each interface card 710 is operatively coupled to a midplane connector port 780 of a different interface card 716 via the midplane 750. Said another way, no two midplane connector ports of the same interface card 710 are operatively coupled to the same interface card 716. Thus, the midplane 750 allows each interface card 710 to send data to and receive data from any of the interface cards 716.

The interface card 716 includes multiple midplane connector ports 780, 1st/3rd stage module systems 712, a 2nd stage module system 719, multiple transmit modules 722, multiple receive modules 724 and multiple cable connector ports 777. The midplane connector ports 780 are configured to send data to and receive data from any of the interface cards 710 within the same switch fabric portion 770 via the midplane 750. In some embodiments, the interface card 716 includes eight midplane connector ports 780 and six cable connector ports 777. In other embodiments, the interface card includes any number of midplane connector ports and/or cable connector ports.

Each 1st/3rd stage module system 712 of the interface card 716 is operatively coupled to each midplane connector port 780. Thus, through the midplane 750, each PFE module system 711 is operatively coupled to each 1st/3rd stage module system 712. Said another way, each PFE module system 711 can send data to and receive data from any 1st/3rd stage module system 712 within the switch fabric portion 770, and vice versa.

The 1st/3rd stage module systems 712 of the interface card 716 can be application-specific integrated circuits (ASICs) or chip packages having multiple ASICs. The 1st/3rd stage module systems 712 can be instances of the same ASIC or chip package. Said another way, the ASIC or chip package of each 1st/3rd stage module system 712 can be substantially similar (i.e., the same kind or type) to the ASIC or chip package of other 1st/3rd stage module systems 712. Thus, manufacturing costs can be decreased because multiple instances of a single ASIC and/or chip package can be produced. Further, a module associated with the first stage and a module associated with the third stage are included on each ASIC and/or each chip package.

The 1st/3rd stage module systems 712 are operatively coupled to the 2nd stage module system 719, the transmit modules 722 and the receive modules 724. Accordingly, the 1st/3rd stage module systems 712 can send data to the 2nd stage module system 719 or a transmit module 722. Similarly, the 1st/3rd stage module systems 712 can receive data from both the 2nd stage module system 719 and the receive modules 724.

The 2nd stage module system 719, the transmit modules 722, the receive modules 724 and the cable connector ports 777 of the interface card 716 are structurally and functionally similar to the 2nd stage module system 519, the transmit modules 522, the receive modules 524 and the cable connector ports 577 of the interface card 516 shown and described above. Accordingly, the 2nd stage module system 719, the transmit modules 722, the receive modules 724 and the cable connector ports 777 of the interface card 716 are not described in detail herein.

In use, data is transferred from a first input/output module (not shown in FIGS. 17-18) to a second input/output module (not shown in FIGS. 17-18) via the three-stage switch fabric system. The first input/output module sends data into a switch fabric portion 770 via a cable (not shown in FIGS. 17-18). The data passes through a cable connector port 760 of one of the interface cards 710 and into a packet preparation module within a PFE module system 711.

The packet preparation module prepares the data to enter the stages of the three-stage switch fabric system. In some embodiments, for example, the data is parsed, classified, forwarded, and queued-and-scheduled. In some embodiments, this includes separating the data into separate portions (e.g., cells) prior to sending the data to the switch fabric. The data is then sent to the buffering module within the PFE module system 711. The buffering module stores the data until it is ready to be sent to the module associated with the first stage of the three-stage switch fabric system.

The buffering module within the PFE module system 711 forwards the data to a module associated with the first stage within a 1st/3rd stage module system 712 by sending the data through one of the midplane connector ports 762 of the interface card 710, through the midplane 750, and to one of the interface cards 716. The data enters the interface card 716 through a midplane connector port 780 of the interface card 716. The data is then sent to the module associated with the first stage within the 1st/3rd stage module system 712. Because the PFE module system 711 is operatively coupled to each 1st/3rd stage module system 712 within the switch fabric portion 770, the buffering module within the PFE module system 711 can send the data to any module associated with the first stage within a 1st/3rd stage module system 712 that is within the same switch fabric portion 770 as the PFE module system 711.

The module associated with the first stage within the 1st/3rd stage module system 712 sends the data to a module associated with the second stage within a 2nd stage module system 719. The module associated with the first stage can send the data to a module associated with the second stage within the 2nd stage module system 719 on the same interface card 716 as the 1st/3rd stage module system 712 or to a module associated with the second stage within a 2nd stage module system 719 within another switch fabric portion 770. If the module associated with the first stage sends the data to the module associated with the second stage within the 2nd stage module system 719 on the same interface card 716 as the 1st/3rd stage module system 712, the module associated with the first stage sends the data directly to the module associated with the second stage. If the module associated with the first stage sends the data to a module associated with the second stage within a 2nd stage module system 719 within another switch fabric portion 770, the module associated with the first stage sends the data to the module associated with the second stage via a transmit module 722, a cable connector port 777, a cable (not shown in FIGS. 17-18), a cable connector port 777 on another interface card 716 in the other switch fabric portion 770 and a receive module 724 within the other switch fabric portion 770.

The module associated with the second stage determines to which switch fabric portion 770 the second input/output module is connected and redirects the data back to a module associated with the third stage within a 1st/3rd stage module system 712 in the corresponding switch fabric portion 770. The module associated with the third stage then sends the data to the PFE module system 711 to which the second input/output module is connected. The PFE module system 711 sends the data to the second input/output module.

In other embodiments, instead of the buffering module sending the data to a single module associated with the first stage, the data is separated into separate portions (e.g., cells) by the packet preparation module and the buffering module forwards a portion of the data to each module associated with the first stage to which the buffering module is operatively coupled (e.g., in this embodiment, the buffering module is operatively coupled to each module associated with the first stage within the switch fabric portion). Each module associated with the first stage can then send cells to each module associated with the second stage to which it is operatively coupled. Each module associated with the second stage then determines how the second input/output module is connected and redirects the portions of the data back to the modules associated with the third stage within the switch fabric portion to which the second input/output module is coupled. The modules associated with the third stage then send the data to the buffering module. The received portions of the data are reconstructed by the packet preparation module and sent to the second input/output module. In some embodiments, the received portions of the data are reconstructed in the packet preparation module of the PFE module system.

Figure 19:
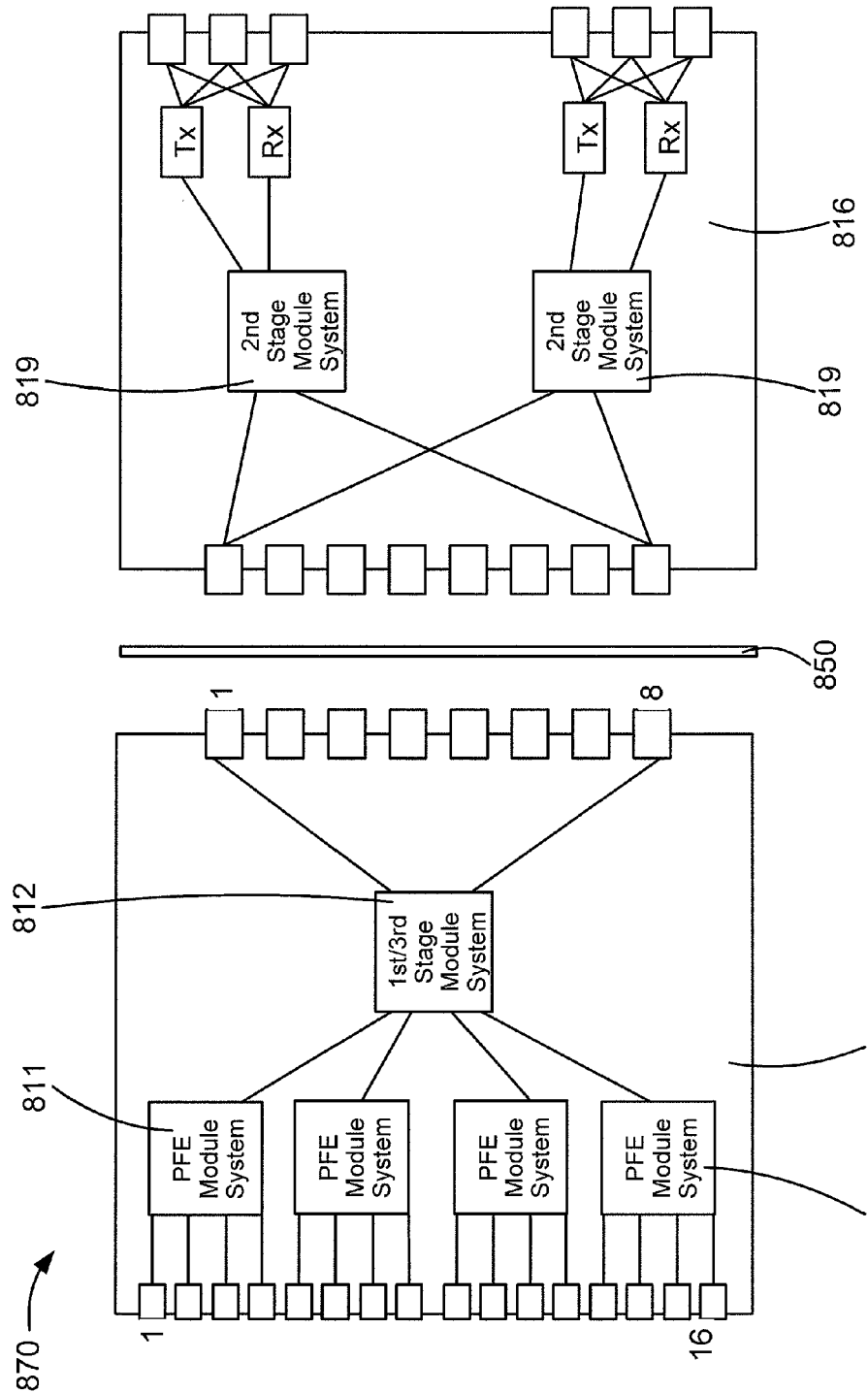
FIG. 19 is a schematic illustration of interface cards of a switch fabric system coupled together by a midplane, according to another embodiment.

In some embodiments, the 1st/3rd stage module systems, the 2nd stage module systems and/or the PFE module systems can have any suitable position on the interface cards. FIG. 19, for example, is a schematic illustration of a switch fabric portion 870 of a three-stage switch fabric system including an interface card 810 having multiple PFE module systems 811 and a 1st/3rd stage module system 812, as well as an interface card 816 having multiple 2nd stage module systems 819. The interface card 810 is operatively coupled to the interface card 816 by a midplane 850.

Figure 20:
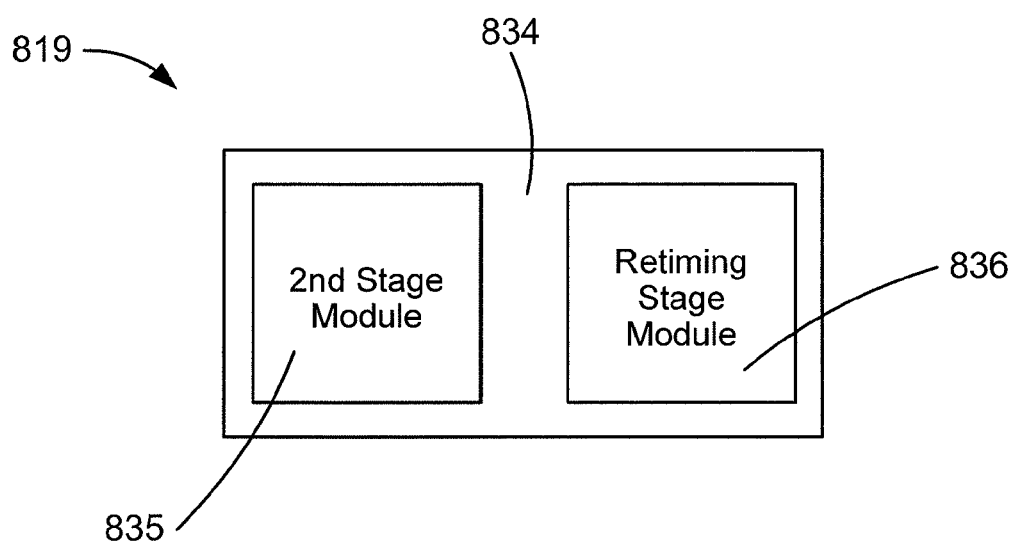
FIG. 20 is a schematic illustration of a second stage module system of the switch fabric system of FIG. 19.

As shown in FIG. 20, in some embodiments, the 2nd stage module systems 819 include a module associated with a second stage 835 of the three-stage switch fabric system and a module associated with a retiming stage 836 of the three-stage switch fabric system. Accordingly, when a module associated with the first stage sends data to a module associated with the second stage, it can either send the data to the module associated with the second stage 835 within the 2nd stage module system 819, or to another module associated with the second stage within another chassis via the retiming stage module 836 within the 2nd stage module system 819. In other embodiments, the switch fabric portion includes separate retiming stage modules similar to the embodiments shown and described above.

The 2nd stage module systems 819 of the interface card 816 are application-specific integrated circuits (ASICs) or chip packages having multiple ASICs. Each 2nd stage module system 819 is an instance of the same ASIC 834 or chip package (see FIG. 20). Said another way, the ASIC or chip package of each 2nd stage module system 819 is substantially similar (i.e., the same kind or type) to the ASIC or chip package of other 2nd stage module systems 819. Thus, manufacturing costs can be decreased because multiple instances of a single ASIC or chip package can be produced. Further, as shown in FIG. 20, a module associated with the second stage 835 and a retiming stage module 836 are included on each ASIC 430 or chip package. In other embodiments, any number of modules associated with the second stage can be included in each 2nd stage module system. In still other embodiments, each 2nd stage module system is an instance of the ASIC or chip package used for the 1st/3rd stage module systems.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, each cable connector port, each midplane connector port, each cable and/or each midplane described above can have any bandwidth necessary to send data through the switch fabric. For example, each cable can have eight data connections, sixteen data connections, thirty-two data connections and/or the like. Similarly, each cable connector port, each midplane connector port, and/or each midplane can have eight data connections, sixteen data connections, thirty-two data connections and/or the like. In some embodiments, each cable connector port, each midplane connector port, each cable and/or each midplane do not all have the same number of data connections. In other embodiments, each cable connector port, each midplane connector port, each cable and/or each midplane have the same number of data connections.

In other embodiments, for example, a switch fabric system can have any number of stages. For example, while the switch fabric systems discussed herein have three or five stages, in other embodiments, the switch fabric system can have seven, nine, eleven, or more stages. This allows the switch fabric system to expand to include additional input/output modules. Additionally, a larger switch fabric system is capable of transferring greater amounts of data.

While the systems shown and described above use a midplane to operatively couple a first set of interface cards to a second set of interface cards within a chassis, in other embodiments, a midplane is not used. For example, in some embodiments, each interface card from the first set of interface cards directly interfaces with each interface card from the second set of interface cards. In some embodiments, for example, a given interface card from the first set of interface cards can be directly coupled to eight interface cards from the second set of interface cards. Similarly, a given interface card from the second set of interface cards can be directly coupled to eight interface cards from the first set of interface cards. In such embodiments, each interface card from the first set of interface cards can send data to each interface card from the second set of interface cards without using a midplane and/or cables.

In other embodiments, free space optics can be used instead of a midplane to operatively couple a first set of interface cards to a second set of interface cards within a chassis. In such embodiments, for example, each interface card can include multiple light sources, such as, for example, vertical-cavity surface-emitting lasers (VCSELs) and multiple light sensors, such as, for example, a PIN array containing multiple PIN diodes. A light source on an interface card from the first set of interface cards is aligned with a light sensor on an interface card from the second set of interface cards, and vice versa. In some embodiments, for example, each of eight light sources on an interface card from the first set of interface cards can be aligned with a light sensor from each of eight interface cards from the second set of interface cards. Similarly, each of eight light sources on an interface card from the second set of interface cards can be aligned with a light sensor from each of eight interface cards from the first set of interface cards. Accordingly, using free space optics, data can be transferred between the first set of interface cards and the second set of interface cards without using a midplane, cables (including optical connectors or fibers) and/or the like.

The number of cables and cable connector ports discussed with respect to the embodiments are for a switch fabric system operating at full capacity. Accordingly, a switch fabric system can have fewer cables and/or ports if operated at less than full capacity. For example, the switch fabric system 500 is described as using 768 cables 540 when operating at full capacity. If 128 of the inputs are not being used, the switch fabric system can operate using 384 cables 540 instead of 768 (i.e., one switch fabric portion 570 is unneeded). Similarly, removing 128 of the inputs allows the system to operate using 768 cable connector ports instead of 1536 cable connector ports.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, where a specific number of modules, interface cards and/or connections has been described, any suitable number of modules, interface cards and/or connections can be used, Further, in any of the described embodiments, modules of each stage of the switch fabric can be within a separate interface card and/or a separate ASIC within an interface card. Similarly, any module can be within any module system. For example, a retiming stage module can be within a 1st/3rd stage module system, a 2nd stage module system or within its own module system. In other embodiments, multiple stages and/or modules can be included on the same interface card, ASIC and/or chip package. Additionally, any of the data paths and/or cables can have any suitable bandwidth.

What is claimed is:

1. A system, comprising:
a first switch fabric portion within a first chassis, the first switch fabric portion having a first processor, a module associated with a first stage of a switch fabric, and a module associated with a third stage of the switch fabric, the first switch fabric portion not having a module associated with a second stage of the switch fabric;
a second switch fabric portion within a second chassis different from the first chassis, the second switch fabric portion having a second processor associated with the module associated with the second stage of the switch fabric and the module associated with a second stage of the switch fabric, the second switch fabric portion not including the module associated with the first stage of a switch fabric or the module associated with the third stage of the switch fabric, the first module of the first switch fabric portion associated with the first stage of the switch fabric configured to send data, via a cable and a midplane, to the module of the second switch fabric portion associated with the second stage of the switch fabric; and
the module associated with the third stage of the switch fabric being configured to receive data, via the cable and the midplane, from the module of the second switch fabric portion associated with the second stage of the switch fabric.

2. The system of claim 1, wherein the second switch fabric portion includes a module associated with the first stage of the switch fabric configured to send data to the module of the second switch fabric portion associated with the second stage of the switch fabric and the module of the first switch fabric portion associated with the second stage of the switch fabric.

3. The system of claim 1, wherein the second switch fabric portion includes a module associated with the first stage of the switch fabric configured to send data to the module of the first switch fabric portion associated with a third stage of the switch fabric via the module of the second switch fabric portion associated with the second stage.

4. The system of claim 1, further comprising:
a third switch fabric portion having a module associated with the third stage of the switch fabric and disposed within a third chassis, the module of the first switch fabric portion associated with the first stage of the switch fabric configured to send data to the module of the third switch fabric portion associated with the third stage of the switch fabric via the module of the second switch fabric portion associated with the second stage of the switch fabric.

5. The system of claim 1, wherein the module of the first switch fabric portion associated with the first stage of the switch fabric and the module of the first switch fabric portion associated with a third stage of the switch fabric are disposed within a common chip package.

6. A method, comprising:
sending a first cell of data, via at least a midplane that is disposed within a first chassis, from a module associated with a first stage of a switch fabric and situated on a first interface card in the first chassis, a first processor situated on the first interface card and associated with the first stage of the switch fabric, to a first module associated with a second stage of the switch fabric on a second interface card including a second processor associated with the first module associated with the second stage of the switch fabric, the second interface card including the first module associated with the second stage being within the first chassis; and
sending a second cell of data, via at least the midplane and a cable, from the module associated with the first stage of the switch fabric to a second module associated with the second stage of the switch fabric and situated on a third interface card in a second chassis different from the first chassis, a third processor situated on the third interface card and associated with the second module associated with the second stage of the switch fabric,
the first interface card not including a module associated with the second stage of the switch fabric, and the second interface card and the third interface card not including a module associated with the first stage of the switch fabric.

7. The method of claim 6, further comprising:
sending the first cell of data from the first module associated with the second stage of the switch fabric to a module associated with a third stage of the switch fabric and disposed on the first interface card within the first chassis; and
sending the second cell of data from the second module associated with the second stage of the switch fabric to the module associated with the third stage of the switch fabric.

8. The method of claim 6, further comprising:

sending the second cell of data from the second module associated with the second stage of the switch fabric to a first module associated with a third stage of the switch fabric and disposed on a fourth interface card within the second chassis;

sending a third cell of data from the module associated with the first stage of the switch fabric to the second module associated with the second stage of the switch fabric; and sending the third cell of data from the second module associated with the second stage of the switch fabric to a second module associated with the third stage of the switch fabric and disposed on a fifth interface card within a third chassis different from the first chassis and the second chassis.

9. A system, comprising:

a plurality of switch fabric portions, each switch fabric portion from the plurality of switch fabric portions being disposed within a separate chassis from a plurality of chassis, each switch fabric portion from the plurality of switch fabric portions having a processor and (1) a first stage module and a third stage module and not a second stage module, or (2) a second stage module and not a first stage module or a third stage module, the second stage module of each switch fabric portion from the plurality of switch fabric portions having the second stage module being operatively coupled, via a first cable and a midplane, to the third stage module of each switch fabric portion from the plurality of switch fabric portions having the first stage module and the third stage module.

10. The system of claim 9, wherein the first stage module of each switch fabric portion from the plurality of switch fabric portions is operatively coupled to the second stage module of each switch fabric portion from the plurality of switch fabric portions.

11. The system of claim 9, wherein the first stage module of a switch fabric portion from the plurality of switch fabric portions and the third stage module of that switch fabric portion are disposed within a common chip package.

12. A system, comprising:

a first module associated with a first stage of a switch fabric;

a third module associated with a third stage of the switch fabric, the first module associated with the first stage of the switch fabric and the third module associated with the third stage of the switch fabric being disposed on a first interface card within a first chassis, the first interface card including a first processor associated with the first module associated with the first stage of the switch fabric and the third module associated with the third stage of the switch fabric, the first interface card not including a second module associated with a second stage of the switch fabric; and the second module associated with the second stage of the switch fabric being operatively coupled to the module associated with the first stage of the switch fabric via a cable and a midplane and disposed on a second interface card within a second chassis different from the first chassis, the second interface card including a second processor associated with the second module associated with the second stage of the switch fabric the second interface card not including a first module associated with the first stage of the switch fabric or a third module associated with the third stage of the switch fabric, the first module associated with the first stage of the switch fabric, the second module associated with the second stage of the switch fabric, and the third module associated with the third stage of the switch fabric defining a first data path between an input module and an output module.

13. The system of claim 12, further comprising:

a fourth module associated with the second stage of the switch fabric and disposed on a third interface card within a third chassis different from the first chassis and the second chassis, the first module associated with the first stage of the switch fabric, the fourth module associated with the second stage of the switch fabric and the third module associated with the third stage of the switch fabric defining a second data path between the input module and the output module.

14. The system of claim 12, wherein a cable operatively couples the second module associated with the second stage with the third module associated with the third stage.

15. The system of claim 12, wherein the input module is a first input module, the system further comprising:

a fourth module associated with the first stage of the switch fabric and disposed on a third interface card within the second chassis, the fourth module associated with the first stage of the switch fabric, the second module associated with the second stage of the switch fabric and the third module associated with the third stage of the switch fabric defining a data path between a second input module and the output module.

* * * * *